US012793616B2

(12) United States Patent
Kim et al.

(10) Patent No.: US 12,793,616 B2
(45) Date of Patent: Nov. 10, 2026

(54) PIXEL CIRCUIT, DISPLAY APPARATUS INCLUDING THE SAME AND ELECTRONIC APPARATUS INCLUDING THE SAME

(71) Applicant: Samsung Display Co., LTD., Yongin-si (KR)

(72) Inventors: Kyungho Kim, Yongin-si (KR); Byungchang Yu, Yongin-si (KR); Jinjoo Ha, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/072,172

(22) Filed: Mar. 6, 2025

(65) Prior Publication Data

US 2025/0363935 A1 Nov. 27, 2025

(30) Foreign Application Priority Data

May 24, 2024 (KR) ........................ 10-2024-0067627

(51) Int. Cl.
*G09G 3/32* (2016.01)

(52) U.S. Cl.
CPC ....... *G09G 3/32* (2013.01); *G09G 2300/0819* (2013.01); *G09G 2310/0267* (2013.01); *G09G 2310/0275* (2013.01); *G09G 2310/08* (2013.01); *G09G 2330/021* (2013.01)

(58) Field of Classification Search
CPC ............. G09G 3/32; G09G 2300/0819; G09G 2310/0267; G09G 2310/0275; G09G 2310/08; G09G 2330/021
See application file for complete search history.

(56) References Cited

U.S. PATENT DOCUMENTS

2016/0055798 A1* 2/2016 Song .................... G09G 3/3233 345/691
2024/0355268 A1* 10/2024 Kim ......................... G09G 3/32

* cited by examiner

*Primary Examiner* — Kenneth B Lee, Jr.
(74) *Attorney, Agent, or Firm* — CANTOR COLBURN LLP

(57) ABSTRACT

A pixel circuit includes a driving transistor including a control electrode connected to a first node, a first electrode connected to a second node, and a second electrode connected to a third node and configured to generate a driving current based on a voltage of the first node, a writing transistor configured to apply a data voltage to the second node in response to a write gate signal, a block control transistor configured to connect the third node and a fourth node in response to a block control signal, an initialization transistor configured to apply an initialization voltage to the third node in response to an initialization gate signal, a compensation transistor configured to connect the fourth node and the first node in response to a compensation gate signal and a light emitting element configured to emit light based on the driving current.

20 Claims, 19 Drawing Sheets

PIXEL CIRCUIT, DISPLAY APPARATUS INCLUDING THE SAME AND ELECTRONIC APPARATUS INCLUDING THE SAME

This application claims priority to Korean Patent Application No. 10-2024-0067627, filed on May 24, 2024, and all the benefits accruing therefrom under 35 U.S.C. § 119, the content of which in its entirety is herein incorporated by reference.

BACKGROUND

1. Field

Embodiments of the present invention relate to a pixel circuit and a display apparatus including the same. More particularly, embodiments of the present invention relate to a pixel circuit reducing a power consumption and the display apparatus including the same.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver providing a gate signal to the gate lines, a data driver providing a data voltage to the data lines, an emission driver providing an emission signal to the emission lines and a driving controller controlling the gate driver, the data driver and the emission driver.

When an image displayed on the display panel is a static image or the display panel is operated in always on mode, a driving frequency of the display panel may be decreased to reduce a power consumption.

SUMMARY

Embodiments of the present invention provide a pixel circuit supporting a multiple division of a driving frequency to reduce a power consumption of the display apparatus.

Embodiments of the present invention also provide a display apparatus including the pixel circuit.

Embodiments of the present invention also provide an electronic apparatus including the pixel circuit.

According to embodiments, a display apparatus includes a display panel including a pixel circuit, a gate emission driver configured to output gate signals to the display panel, a data driver configured to apply a data voltage to the display panel and a block control driver configured to output a block control signal to the display panel. The pixel circuit includes a driving transistor including a control electrode connected to a first node, a first electrode connected to a second node, and a second electrode connected to a third node and configured to generate a driving current based on a voltage of the first node, a writing transistor configured to apply the data voltage to the second node in response to a write gate signal, a block control transistor configured to connect the third node and a fourth node in response to the block control signal, an initialization transistor configured to apply an initialization voltage to the third node in response to an initialization gate signal, a compensation transistor configured to connect the fourth node and the first node in response to a compensation gate signal and a light emitting element configured to emit light based on the driving current.

In an embodiment, a period in which the pixel circuit is driven may include an address period in which the light emitting element emits light based on a data voltage of a present frame and a self-scan period following the address period, in which the light emitting element emits light based on a data voltage of a previous frame. In the address period, the block control signal may have an activation level and the block control transistor may be turned on.

In an embodiment, the address period may include a first initialization period, a first writing period and a first emission period. In the first initialization period, the initialization gate signal, the compensation gate signal and the block control signal may have the activation level. In the first writing period, the write gate signal, the compensation gate signal and the block control signal may have the activation level. In the first initialization period and the first writing period, the block control transistor may be turned on.

In an embodiment, in the self-scan period, the block control signal may have an inactivation level and the block control transistor may be turned off.

In an embodiment, the self-scan period may include a second initialization period, a second writing period and a second emission period. In the second initialization period and the second writing period, the block control signal may have an inactivation level.

In an embodiment, the gate emission driver may further output an emission signal. The pixel circuit may further include a first emission transistor configured to apply a first power voltage to the second node in response to the emission signal and a second emission transistor configured to apply the driving current to a fifth node in response to the emission signal.

In an embodiment, the pixel circuit may further include a light emitting element initialization transistor configured to apply a light emitting element initialization voltage to the fifth node in response to a bias gate signal and a bias transistor configured to apply a bias voltage to the second node in response to the bias gate signal.

In an embodiment, the writing transistor may include a control electrode for receiving the write gate signal, a first electrode for receiving the data voltage and a second electrode connected to the second node. The compensation transistor may include a control electrode for receiving the compensation gate signal, a first electrode connected to the fourth node and a second electrode connected to the first node. The initialization transistor may include a control electrode for receiving the initialization gate signal, a first electrode for receiving the initialization voltage and a second electrode connected to the third node. The block control transistor may include a control electrode for receiving the block control signal, a first electrode connected to the third node and a second electrode connected to the fourth node.

In an embodiment, the gate emission driver may further output an emission signal. The pixel circuit may further include a first emission transistor including a control electrode for receiving the emission signal, a first electrode for receiving a first power voltage and a second electrode connected to the second node and a second emission transistor including a control electrode for receiving the emission signal, a first electrode connected to the third node and a second electrode connected to a fifth node. The light emitting element may include a first electrode connected to the fifth node and a second electrode for receiving a second power voltage.

In an embodiment, the pixel circuit may further include a light emitting element initialization transistor including a control electrode for receiving a bias gate signal, a first electrode for receiving a light emitting element initialization voltage and a second electrode connected to the fifth node and a bias transistor including a control electrode for receiving the bias gate signal, a first electrode for receiving a bias voltage and a second electrode connected to the second node.

In an embodiment, wherein the driving transistor and the writing transistor may be P-type transistors. The compensation transistor, the initialization transistor and the block control transistor may be N-type transistors.

In an embodiment, the gate signals may be outputted to the pixel circuit through gate lines extend in a first direction. The data signal may be outputted to the pixel circuit through a data line extend in a second direction different from the first direction. The block control signal may be outputted to the pixel circuit through a block control line extend in the second direction.

In an embodiment, the display panel may include a first display region located spaced apart from the gate emission driver in a first direction and a second display region located adjacent to the first display region in the first direction. A driving frequency of the first display region may be different from a driving frequency of the second display region.

In an embodiment, the gate emission driver may include a gate signal block and an output control signal block configured to control an output of the gate signal block. The gate signal block may generate a carry signal and the gate signal based on a previous carry signal and output the gate signal in response to an output control signal. The display panel may further include a third display region located adjacent to the first display region in a second direction different from the first direction. The driving frequency of the second display region may be different from a driving frequency of the third display region.

According to embodiments, a display apparatus includes a display panel including a pixel circuit, a gate emission driver configured to output gate signals to the display panel, a data driver configured to apply a data voltage to the display panel and a block control driver configured to output a block control signal to the display panel. The pixel circuit includes a driving transistor including a control electrode connected to a first node, a first electrode connected to a second node, and a second electrode connected to a third node and configured to generate a driving current based on a voltage of the first node, a writing transistor configured to apply the data voltage to the second node in response to a write gate signal, a compensation transistor configured to connect the third node and a fourth node in response to a compensation gate signal, a block control transistor configured to connect the fourth node and the first node in response to the block control signal, an initialization transistor configured to apply an initialization voltage to the fourth node in response to an initialization gate signal and a light emitting element configured to emit light based on the driving current.

In an embodiment, a period in which the pixel circuit is driven may include an address period in which the light emitting element emits light based on a data voltage of a present frame and a self-scan period following the address period, in which the light emitting element emits light based on a data voltage of a previous frame. In the address period, the block control signal may have an activation level and the block control transistor may be turned on.

In an embodiment, in the self-scan period, the block control signal may have an inactivation level and the block control transistor may be turned off.

In an embodiment, wherein the driving transistor and the writing transistor may be P-type transistors. The compensation transistor, the initialization transistor and the block control transistor may be N-type transistors.

In an embodiment, the gate signals may be outputted to the pixel circuit through gate lines extend in a first direction. The data signal may be outputted to the pixel circuit through a data line extend in a second direction different from the first direction. The block control signal may be outputted to the pixel circuit through a block control line extend in the second direction.

According to embodiments, a pixel circuit includes a driving transistor including a control electrode connected to a first node, a first electrode connected to a second node, and a second electrode connected to a third node and configured to generate a driving current based on a voltage of the first node, a writing transistor configured to apply a data voltage to the second node in response to a write gate signal, a block control transistor configured to connect the third node and a fourth node in response to a block control signal, an initialization transistor configured to apply an initialization voltage to the third node in response to an initialization gate signal, a compensation transistor configured to connect the fourth node and the first node in response to a compensation gate signal and a light emitting element configured to emit light based on the driving current.

In an embodiment, a period in which the pixel circuit is driven may include an address period in which the light emitting element emits light based on a data voltage of a present frame and a self-scan period following the address period, in which the light emitting element emits light based on a data voltage of a previous frame. In the address period, the block control signal may have an activation level and the block control transistor may be turned on.

In an embodiment, the address period may include a first initialization period, a first writing period and a first emission period. In the first initialization period, the initialization gate signal, the compensation gate signal and the block control signal may have the activation level. In the first writing period, the write gate signal, the compensation gate signal and the block control signal may have the activation level. In the first initialization period and the first writing period, the block control transistor may be turned on.

In an embodiment, in the self-scan period, the block control signal may have an inactivation level and the block control transistor may be turned off.

In an embodiment, the self-scan period may include a second initialization period, a second writing period and a second emission period. In the second initialization period and the second writing period, the block control signal may have an inactivation level.

In an embodiment, the driving transistor and the writing transistor may be P-type transistors. The compensation transistor, the initialization transistor and the block control transistor may be N-type transistors.

According to embodiments, an electronic apparatus includes a display panel including a pixel circuit, a gate emission driver configured to output gate signals to the display panel, a data driver configured to apply a data voltage to the display panel, a block control driver configured to output a block control signal to the display panel, a driving controller configured to control the gate emission driver, the data driver and the block control driver based on an input control signal and a processor configured to output the input control signal. The pixel circuit includes a driving transistor including a control electrode connected to a first node, a first electrode connected to a second node, and a second electrode connected to a third node and configured to generate a driving current based on a voltage of the first node, a writing transistor configured to apply the data voltage to the second node in response to a write gate signal, a block control transistor configured to connect the third node and a fourth node in response to the block control signal, an initialization transistor configured to apply an initialization voltage to the third node in response to an initialization gate signal, a compensation transistor configured to connect the fourth node and the first node in response to a compensation gate signal and a light emitting element configured to emit light based on the driving current.

In an embodiment, a period in which the pixel circuit is driven may include an address period in which the light emitting element emits light based on a data voltage of a present frame and a self-scan period following the address period, in which the light emitting element emits light based on a data voltage of a previous frame. In the address period, the block control signal may have an activation level and the block control transistor may be turned on.

As described above, a writing operation and an initialization operation of the pixel circuit may be controlled based on a block control signal. Accordingly, a display apparatus may support the multiple division of the driving frequency.

Additionally, through the multiple division of the driving frequency, a power consumption of the display apparatus may be effectively reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

Hereinafter, the present invention will be explained in detail with reference to the accompanying drawings.

Figure 1:
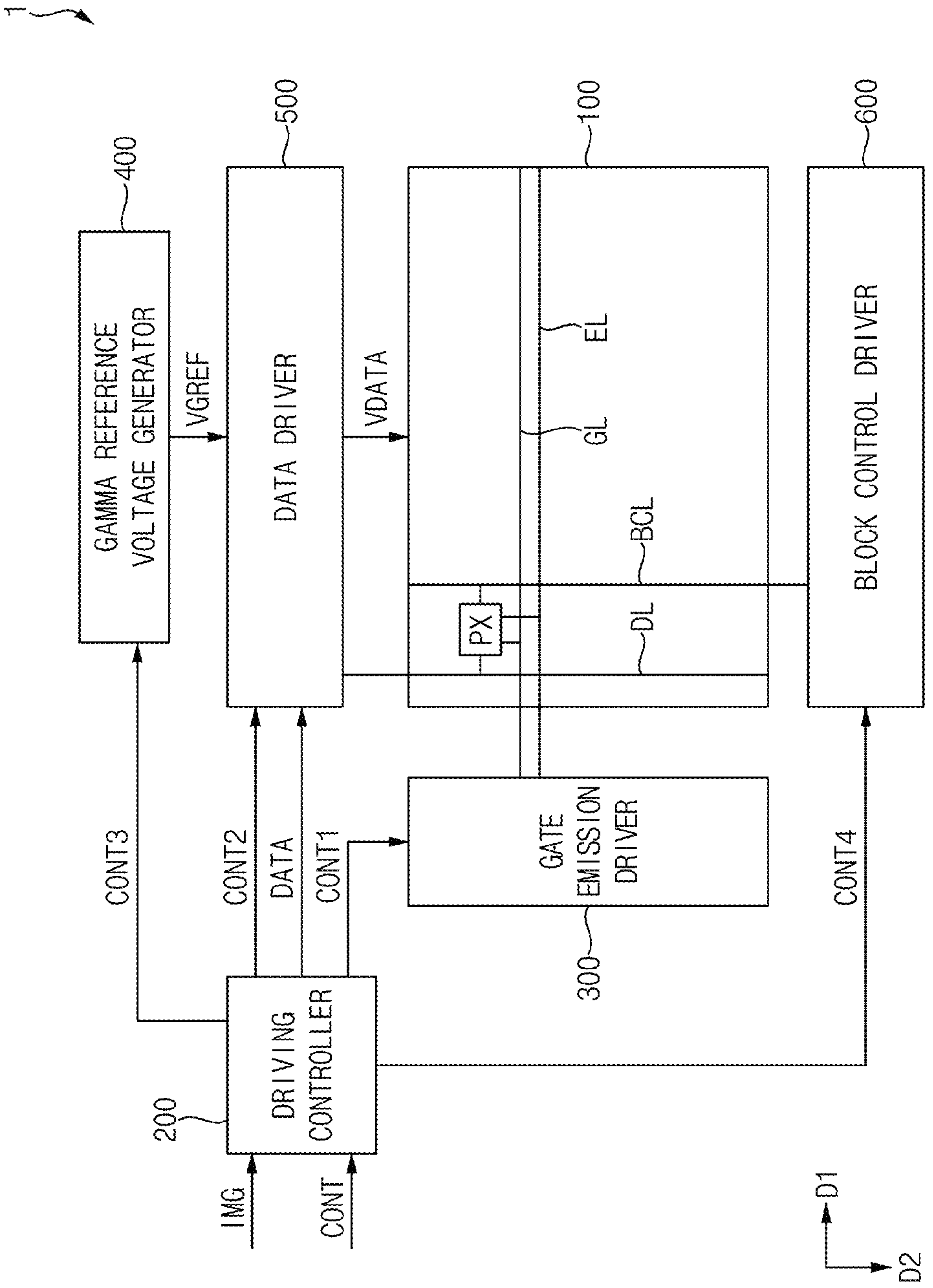
FIG. 1 is a block diagram illustrating a display apparatus according to embodiments of the present invention.

FIG. 1 is a block diagram illustrating a display apparatus 1 according to embodiments of the present invention.

Referring to FIG. 1, the display apparatus 1 may include a display panel 100 and a display panel driver. The display panel driver may include a driving controller 200, a gate emission driver 300, a gamma reference voltage generator 400, a data driver 500 and block control driver 600.

The display panel 100 may have a display region on which an image is displayed and a peripheral region adjacent to the display region.

The display panel 100 may include a plurality of gate lines GL, a plurality of data lines DL, a plurality of emission lines EL, a plurality of block control lines BCL and a plurality of pixel circuits PX electrically connected to the gate lines GL, the data lines DL, the emission lines EL and the block control lines BCL. The gate lines GL may extend in a first direction D1. The data lines DL may extend in a second direction D2 crossing the first direction D1. The emission lines EL may extend in the first direction D1. The block control lines BCL may extend in the second direction D2.

The driving controller 200 may receive input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4 and a data signal DATA based on the input image data IMG and the input control signal CONT.

The driving controller 200 may generate the first control signal CONT1 for controlling an operation of the gate emission driver 300 based on the input control signal CONT, and output the first control signal CONT1 to the gate emission driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the block control driver 600 based on the input control signal CONT, and output the fourth control signal CONT4 to the block control driver 600.

The gate emission driver 300 may generate gate signals driving the gate lines GL in response to the first control signal CONT1 received from the driving controller 200. The gate emission driver 300 may generate emission signals EM of FIG. 2 driving the emission lines EL in response to the first control signal CONT1 received from the driving controller 200. The gate emission driver 300 may output the gate signals to the gate lines GL. The gate emission driver 300 may output the emission signal to the emission line EL. For example, the gate signals may include an initialization gate signal GI of FIG. 2, a write gate signal GW of FIG. 2, a compensation gate signal GC of FIG. 2 and a bias gate signal GB of FIG. 4.

In an embodiment, the gate emission driver 300 may be integrated in the peripheral region. In an embodiment, the gate emission driver 300 may be disposed in the peripheral region.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to a level of the data signal DATA.

In an embodiment, the gamma reference voltage generator 400 may be disposed in the driving controller 200, or in the data driver 500.

The data driver 500 may receive the second control signal CONT2 and the data signal DATA from the driving controller 200, and receive the gamma reference voltages VGREF from the gamma reference voltage generator 400. The data driver 500 may convert the data signal DATA into data voltages having an analog type using the gamma reference voltages VGREF. The data driver 500 may output the data voltages to the data lines DL.

In an embodiment, the data driver 500 may be integrated in the peripheral region. In an embodiment, the data driver 500 may be disposed in the peripheral region.

Figure 2:
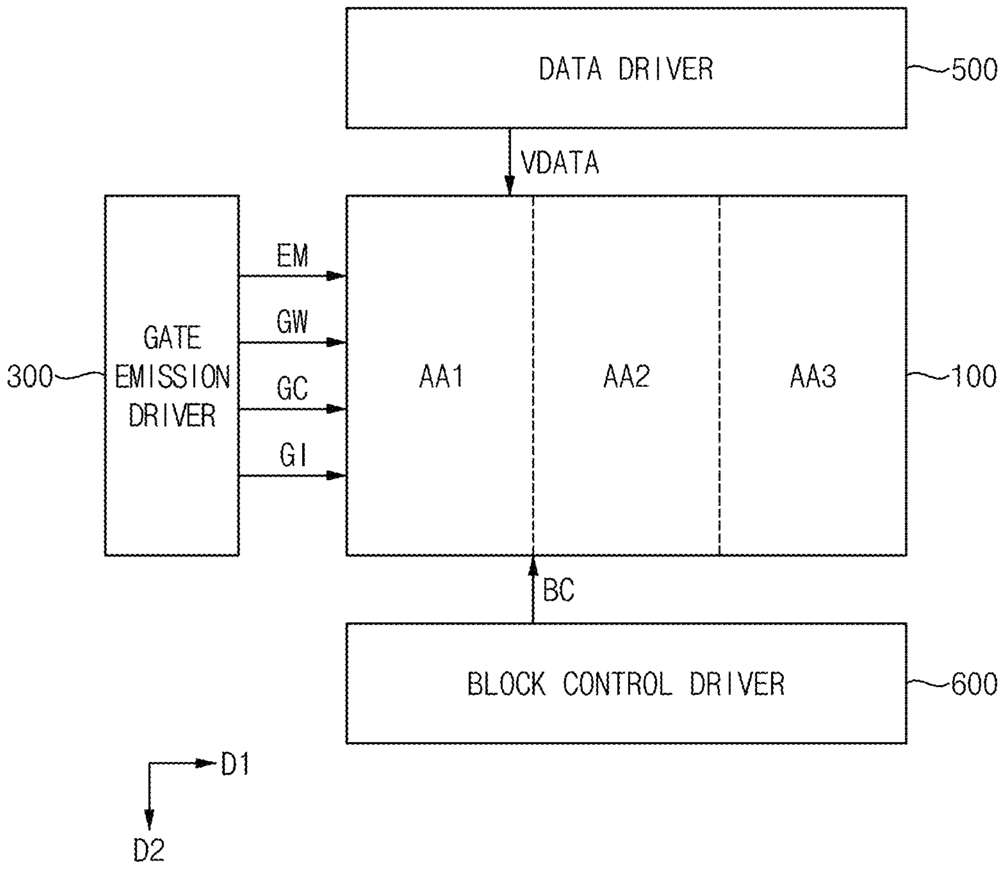
FIG. 2 is a block diagram illustrating a display panel, a gate emission driver, a data driver and a block control driver of FIG. 1.

The block control driver 600 may generate a block control signal BC of FIG. 2 in response to the fourth control signal CONT4 received from the driving controller 200. The block control driver 600 may output the block control signal BC of FIG. 2 to the display panel 100.

In an embodiment, the block control driver 600 may be integrated in the peripheral region. In an embodiment, the block control driver 600 may be disposed in the peripheral region.

FIG. 2 is a block diagram illustrating a display panel 100, a gate emission driver 300, a data driver 500 and a block control driver 600 of FIG. 1.

Referring to FIG. 1 and FIG. 2, the display panel 100 may include a first display region AA1, a second display region AA2 and a third display region AA3. For example, the display region may include the first display region AA1, the second display region AA2 and the third display region AA3.

The first display region AA1 may be located spaced apart from the gate emission driver 300 in the first direction D1. The second display region AA2 may be located adjacent to the first display region AA1 in the first direction D1. The third display region AA3 may be located adjacent to the second display region AA2 in the first direction D1. A driving frequency of the first display region AA1, a driving frequency of the second display region AA2 and a driving frequency of the third display region AA3 may be different from each other. For example, the first display region AA1 may emit as a first driving frequency. For example, the second display region AA2 may emit as the first driving frequency. For example, the second display region AA2 may emit as a second driving frequency different from the first driving frequency. For example, the first driving frequency may be about 1 Hz. For example, the second driving frequency may be about 120 Hz. However, the present invention is not limited to a value of the driving frequency.

The driving frequency of the first display region AA1 may be different from the driving frequency of the second display region AA2, so that the display panel 100 may support the multiple division of the driving frequency. The display panel 100 may support the multiple division of the driving frequency, so that a power consumption of the display apparatus 1 may be reduced. For example, display panel 100 may support the horizontal multiple division of the driving frequency.

Figure 3:
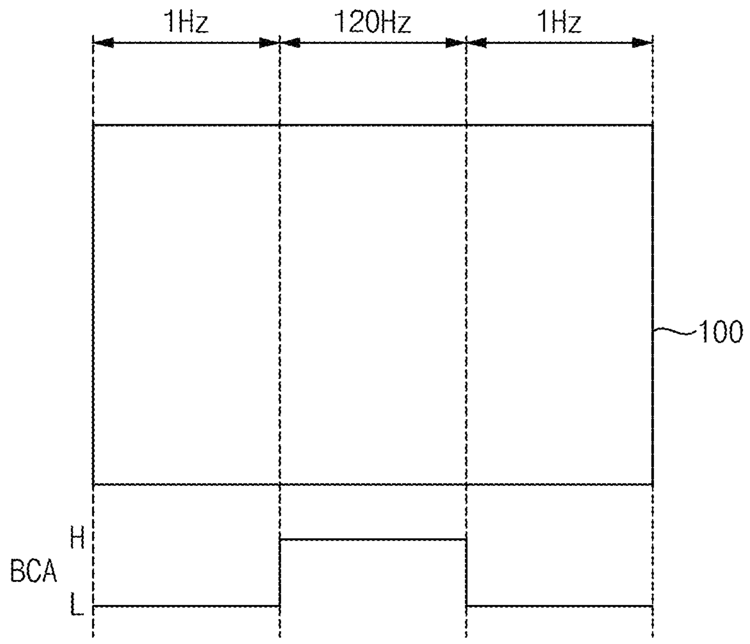
FIG. 3 is a conceptual diagram illustrating a block control signal outputted from a block control driver of FIG. 1 according to driving frequencies of portions of the display panel of FIG. 1.
Figure 4:
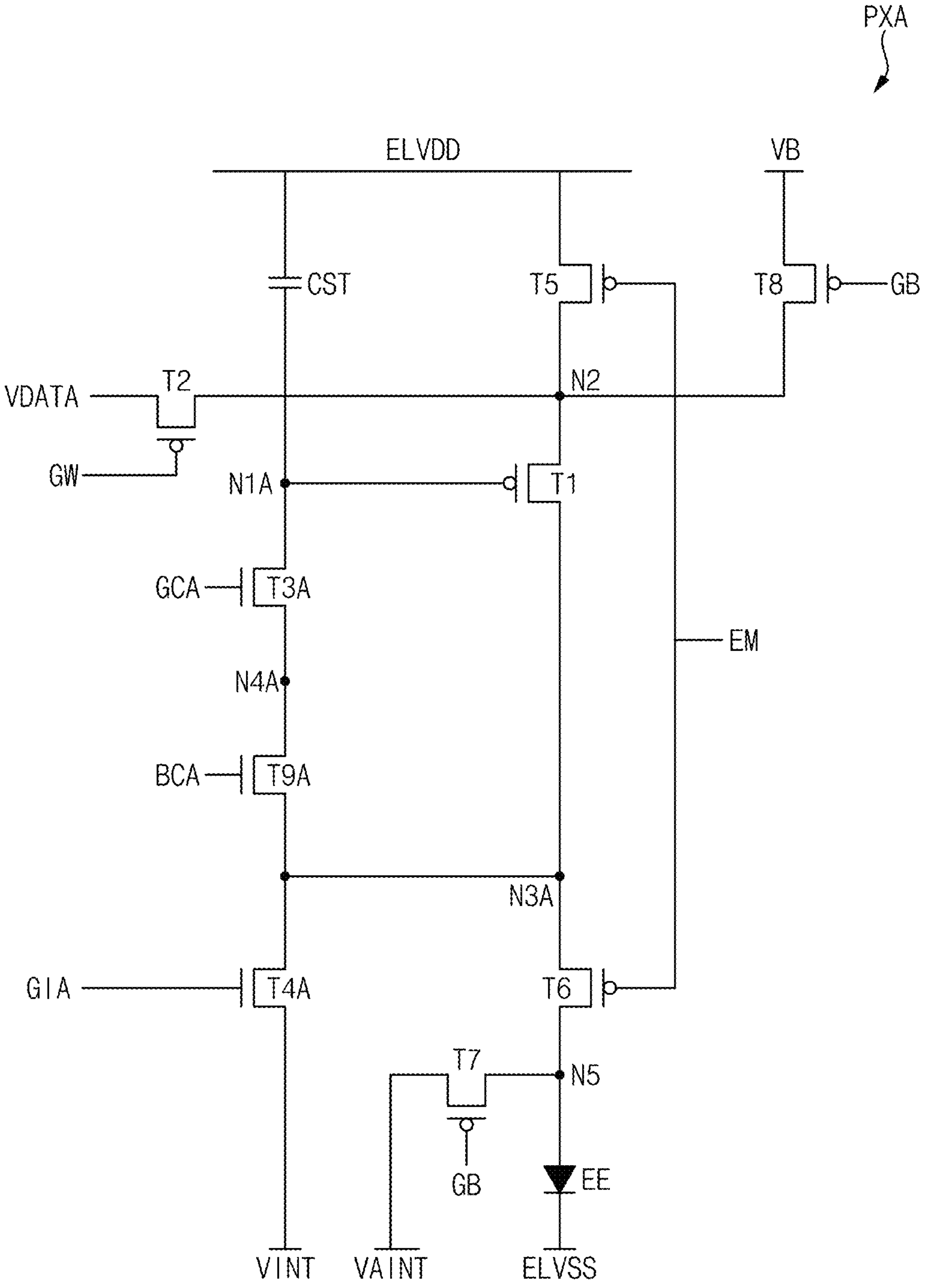
FIG. 4 is a circuit diagram illustrating an example of a pixel circuit of FIG. 1.

FIG. 3 is a conceptual diagram illustrating a block control signal BC outputted from a block control driver 600 of FIG. 1 according to driving frequencies of portions of the display panel 100 of FIG. 1. FIG. 4 is a circuit diagram illustrating an example of a pixel circuit PX of FIG. 1.

Referring to FIG. 1 to FIG. 4, a pixel circuit PXA may include a first transistor T1, a second transistor T2, a third transistor T3, a fourth transistor T4, a fifth transistor T5, a sixth transistor T6, a seventh transistor T7, an eighth transistor T8, a ninth transistor T9A, a storage capacitor CST and a light emitting element EE.

The first transistor T1 may include a control electrode connected to a first node NIA, a first electrode connected to a second node N2 and a second electrode connected to a third node N3A. The first transistor T1 may generate a driving current based on a voltage of the first node NIA. For example, the first transistor T1 may be called as a "driving transistor".

The second transistor T2 may include a control electrode for receiving the write gate signal GW, a first electrode for receiving the data voltage VDATA and a second electrode connected to the second node N2. The second transistor T2 may apply the data voltage VDATA to the second node N2 in response to the write gate signal GW. For example, an operation that the second transistor T2 applies the data voltage VDATA may be called as a writing operation. For example, the second transistor T2 may be called as a "writing transistor".

The third transistor T3A may include a control electrode for receiving the compensation gate signal GC, a first electrode connected a fourth node N4A and a second electrode connected to the first node NIA. The third transistor T3A may connect the fourth node N4A and the first node NIA in response to the compensation gate signal GC. For example, the third transistor T3A may be called as a "compensation transistor".

The fourth transistor T4A may include a control electrode for receiving the initialization gate signal GIA, a first electrode for receiving the initialization voltage VINT and a second electrode connected to the third node N3A. The fourth transistor T4A may apply the initialization voltage VINT to the third node N3A in response to the initialization gate signal GIA. For example, an operation that the initialization voltage is applied to the first node NIA may be called as an initialization operation. For example, the fourth transistor T4A may be called as an "initialization transistor".

The fifth transistor T5 may include a control electrode for receiving the emission signal EM, a first electrode for receiving a first power voltage ELVDD and a second electrode connected to the second node N2. The fifth transistor T5 may apply the first power voltage ELVDD to the second node N2 in response to the emission signal EM. For example, the fifth transistor T5 may be called as a "first emission transistor".

The sixth transistor T6 may include a control electrode for receiving the emission signal EM, a first electrode connected to the third node N3A and a second electrode connected to a fifth node N5. The sixth transistor T6 may connect the third node N3 and the fifth node N5 in response to the emission signal EM. The sixth transistor T6 may output the driving current in response to the emission signal EM. For example, the sixth transistor T6 may be called as a "second emission transistor".

The seventh transistor T7 may include a control electrode for receiving the bias gate signal GB, a first electrode for receiving a light emitting element initialization voltage VAINT and a second electrode connected to the fifth node N5. The seventh transistor T7 may apply the light emitting element initialization voltage VAINT to the fifth node N5 in response to the bias gate signal GB. The light emitting element initialization voltage VAINT may be lower than a second power voltage ELVSS. The light emitting element initialization voltage VAINT may be lower than a second power voltage ELVSS, so that a black characteristic of the pixel circuit PXA may be improved. For example, the seventh transistor T7 may be called as a "light emitting element initialization transistor".

The eighth transistor T8 may include a control electrode for receiving the bias gate signal GB, a first electrode for receiving a bias voltage VB and a second electrode connected to the second node N2. The eighth transistor T8 may apply the bias voltage VB to the second node N2 in response to the bias gate signal GB. For example, the eighth transistor T8 may be called as a "bias transistor".

The ninth transistor T9 may include a control electrode for receiving the block control signal BCA, a first electrode connected to the third node N3A and a second electrode connected to the fourth node N4A. The ninth transistor T9A may connect the third node N3A and the fourth node N4A in response to the block control signal BCA. For example, the ninth transistor T9A may be called as a "block control transistor".

The storage capacitor CST may include a control electrode for receiving the first power voltage ELVDD and a second electrode connected to the first node N1A.

The light emitting element EE may include a first electrode connected to the fifth node N5 and a second electrode for receiving the second power voltage ELVSS. The light emitting element EE may emit light based on the driving current.

For example, when the block control signal BCA has an activation level, the ninth transistor T9A may be turned on. In the present embodiment, the activation level of the block control signal BCA may be a high level H.

For example, when the block control signal BCA has an inactivation level, the ninth transistor T9A may be turned off. In the present embodiment, the inactivation level of the block control signal BCA may be a low level L. As used herein, the "activation level" of a signal is a level of the signal, which turns on a corresponding transistor when the signal is provided to a control electrode of the transistor, and the "inactivation level" of a signal is a level of the signal, which turns off the corresponding transistor when the signal is provided to the control electrode of the transistor.

The pixel circuit PXA may emit light as a high frequency (e.g., 120 Hz) for a region within the display panel 100 that requires high-frequency driving, and may emit light as a low frequency (e.g., 1 Hz) for a region within the display panel 100 that requires low-frequency driving, based on a block control signal BCA.

For example, when the display panel 100 emits light as the high frequency, the block control signal BCA may have an activation level and the ninth transistor T9A may be turned on. The ninth transistor T9A may be turned on, so that a voltage of the first node NIA may be initialized and the writing operation may be performed.

For example, when the display panel 100 emits light as the low frequency, the block control signal BCA may have an inactivation level and the ninth transistor T9A may be turned off. The ninth transistor T9A may be turned off, so that a voltage of the first node NIA may be maintained. Accordingly, the pixel circuit PXA emit light based on a data voltage of a previous frame.

In the present embodiment, the pixel may include a transistor of a first type and a transistor of a second type different from the first type. For example, the transistor of the first type may be a polysilicon thin film transistor. For example, the transistor of the first type may be a low temperature polysilicon (LTPS) thin film transistor. For example, the transistor of the second type may be an oxide thin film transistor. For example, the transistor of the first type may be a P-type transistor and the transistor of the second type may be an N-type transistor.

Although some of the transistors of the pixel are the oxide thin film transistors and other transistor of the pixel are the polysilicon thin film transistors in the present embodiment, the present invention may not be limited thereto. The present invention may be applied to the pixel including only the oxide thin film transistors.

Although some of the transistors of the pixel are the N-type transistors and other transistors of pixel are the P-type transistors in the present embodiment, the present invention may not be limited thereto. The present invention may be applied to the pixel including only the N-type transistors. The present invention may be applied to the pixel including only the P-type transistors.

In the present embodiment, the first transistor T1, the second transistor T2, the fifth transistor T5, the sixth transistor T6, the seventh transistor T7 and the eighth transistor T8 may be P-type transistors. The third transistor T3A, the fourth transistor T4A and the ninth transistor T9A may be N-type transistors.

Figure 5:
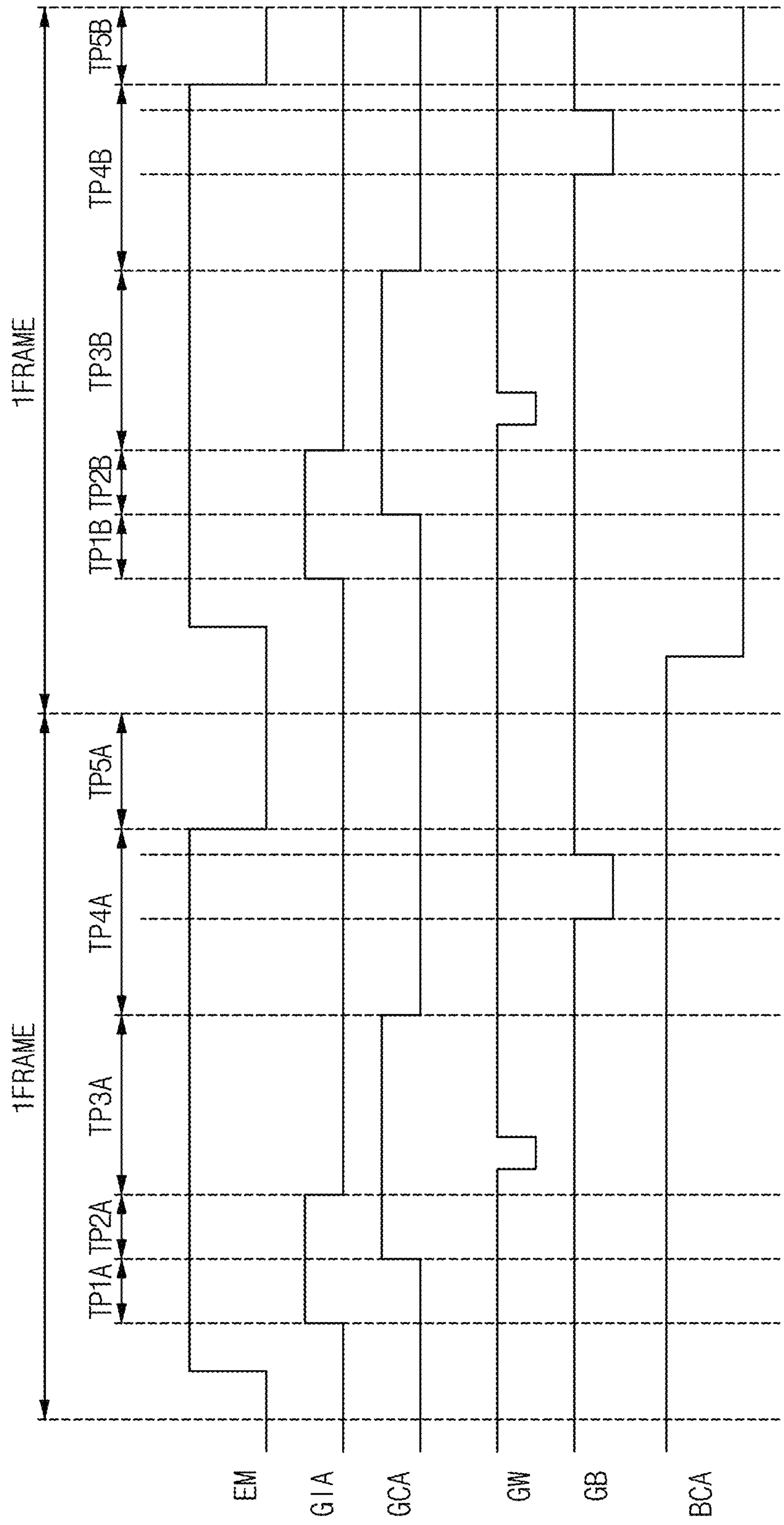
FIG. 5 is a timing diagram illustrating signals applied to a pixel circuit of FIG. 4.

FIG. 5 is a timing diagram illustrating signals applied to a pixel circuit PXA of FIG. 4.

Referring to FIG. 1 to FIG. 5, a period in which the pixel circuit PXA is driven may include an address period and a self-scan period.

In the address period corresponding to the first frame in FIG. 5, the initialization operation and the writing operation may be performed. In the address period, the pixel circuit PXA may emit light based on a data voltage of a present frame. In the self-scan period corresponding to the second frame in FIG. 5, the initialization operation and the writing operation may not be performed. In the self-scan period, the pixel circuit PXA may emit light based on a data voltage of a previous frame.

Figure 6:
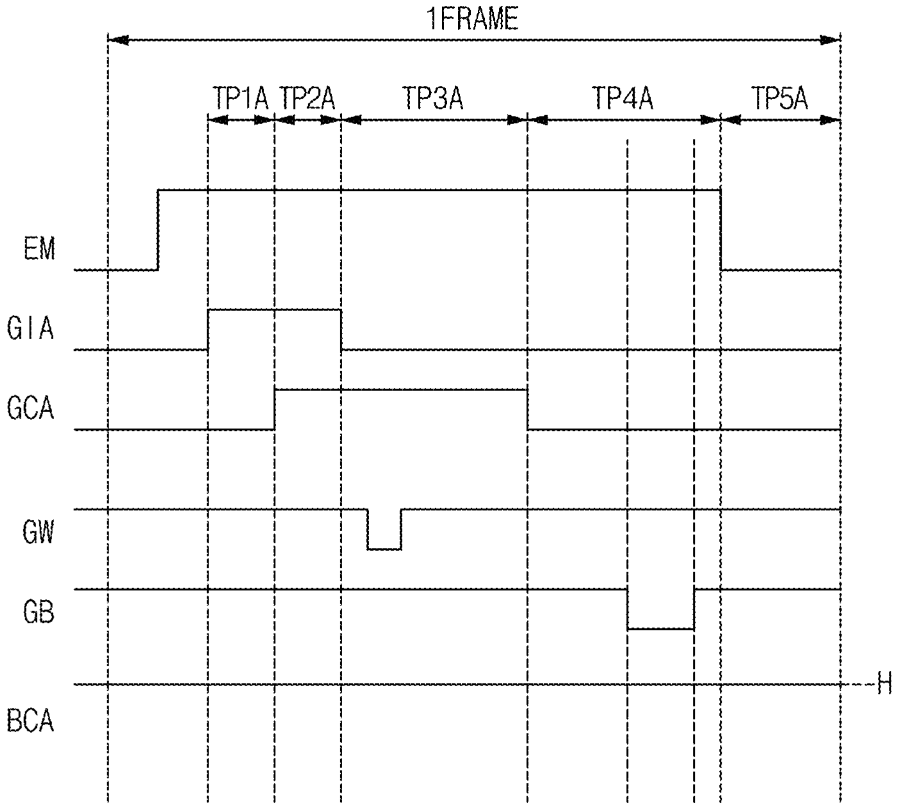
FIG. 6 is a timing diagram illustrating signals applied to a pixel circuit in an address period of FIG. 5.
Figure 7:
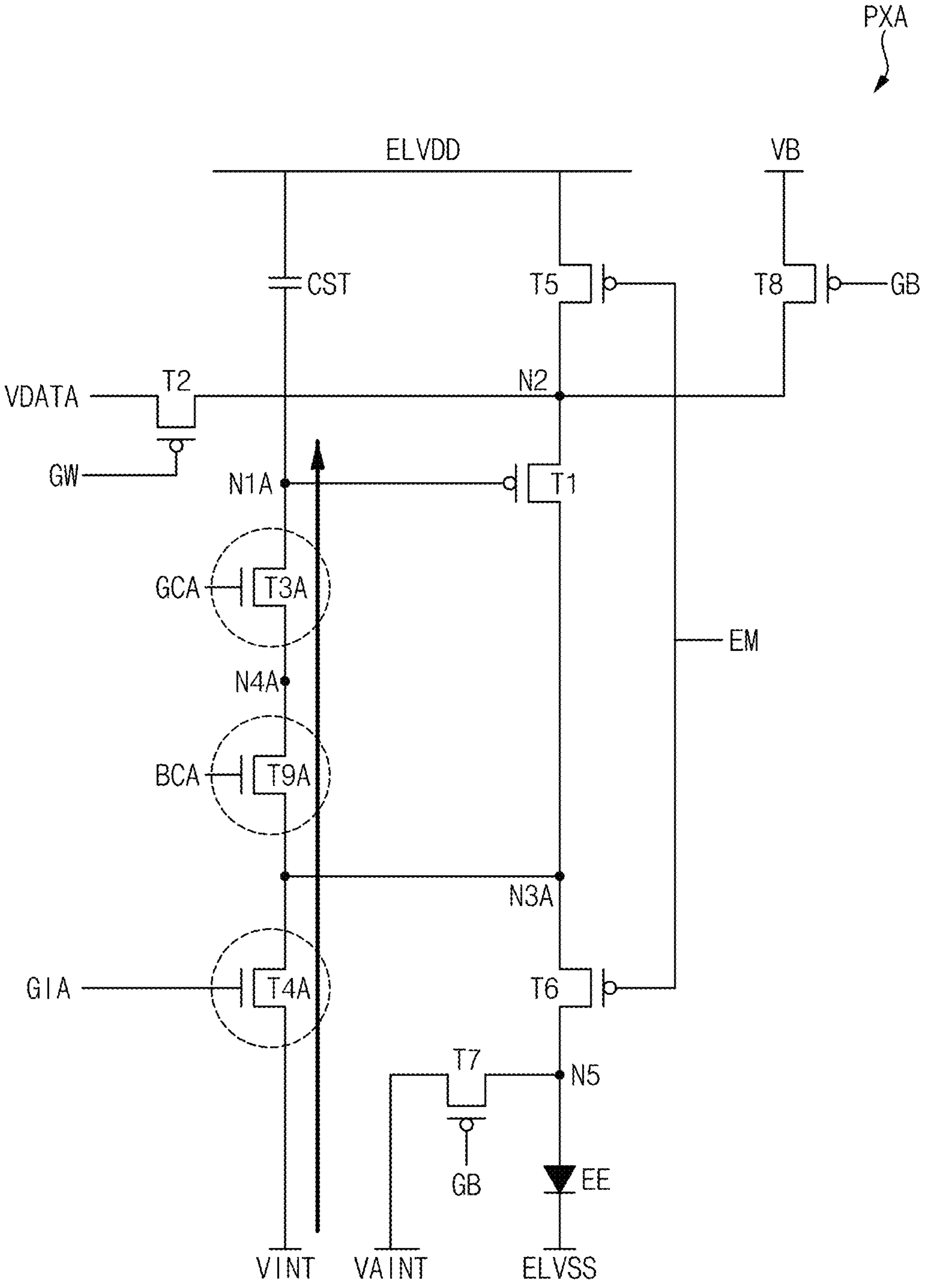
FIG. 7 is a circuit diagram illustrating an operation of a pixel circuit in a first initialization period.
Figure 8:
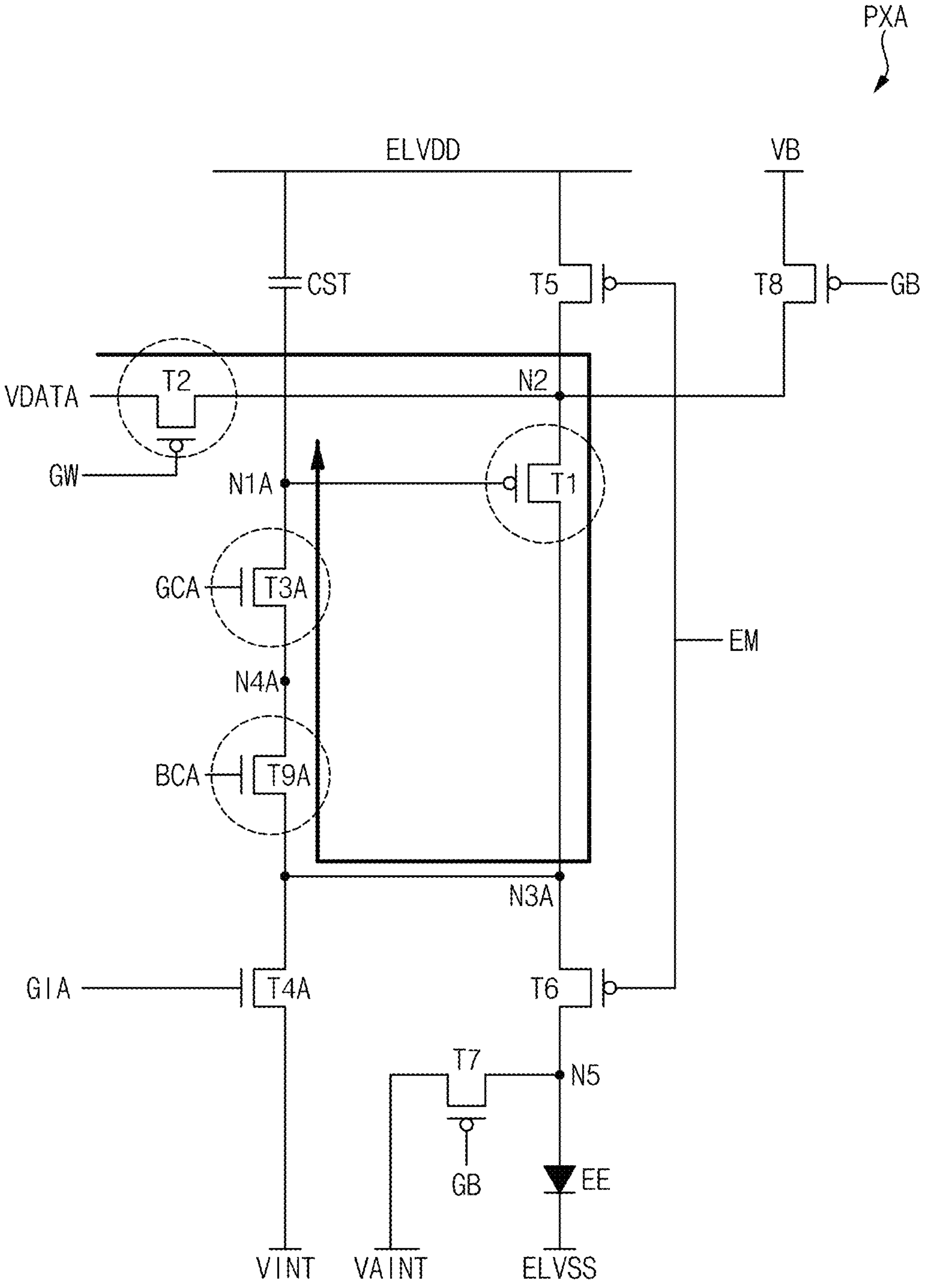
FIG. 8 is a circuit diagram illustrating an operation of a pixel circuit in a first writing period.

FIG. 6 is a timing diagram illustrating signals applied to a pixel circuit in an address period of FIG. 5. FIG. 7 is a circuit diagram illustrating an operation of a pixel circuit PXA in a first initialization period. FIG. 8 is a circuit diagram illustrating an operation of a pixel circuit PXA in a first writing period.

Referring to FIG. 1 to FIG. 8, the address period may include a first period TP1A, a second period TP2A, a third period TP3A, a fourth period TP4A and a fifth period TP5A.

In the first period TP1A, the initialization gate signal GIA may have an activation level, the compensation gate signal GCA may have an inactivation level, the write gate signal GW may have an inactivation level and the block control signal BCA may have an activation level. In the first period TP1A, the fourth transistor T4A and the ninth transistor T9A may be turned on. Accordingly, the initialization voltage VINT may be applied to the fourth node N4.

In the second period TP2A, as shown in FIG. 7, the initialization gate signal GIA may have an activation level, the compensation gate signal GCA may have an activation level, the write gate signal GW may have an activation level, and the block control signal BCA may have an activation level. In the second period TP2A, the third transistor T3A, the fourth transistor T4A and the ninth transistor T9A may be turned on. Accordingly, the initialization voltage VINT may be applied to the first node NIA. Accordingly, a voltage of the first node NIA may be initialized as the initialization voltage VINT. For example, the second period TP2A may be called as a "first initialization period".

In the third period TP3A, as shown in FIG. 8, the initialization gate signal GIA may have an inactivation level, the compensation gate signal GCA may have an activation level, the write gate signal GW may have an activation level and the block control signal BCA may have an activation level. In the third period TP3A, the second transistor T2 may be turned on in response to the write gate signal GW. The second transistor T2 may be turned on, so that the data voltage VDATA may be applied to the second node N2. In the third period TP3A, the third transistor T3A may be turned on in response to the compensation gate signal GCA. In the third period TP3A, the ninth transistor T9A may be turned on in response to the block control signal BCA. The third transistor T3A and the ninth transistor T9A may diode-connect the first transistor T1. Accordingly, a voltage summing the data voltage VDATA and a threshold voltage of the first transistor T1 may be applied to the first node NIA. For example, the voltage summing the data voltage VDATA and a threshold voltage of the first transistor T1 may be called as a compensation data voltage. For example, the third period TP3A may be called as a "first writing period".

In the fourth period TP4A, the initialization gate signal GIA may have an inactivation level, the compensation gate signal GCA may have an inactivation level, the write gate signal GW may have an inactivation level and the bias gate signal GB may have an activation level. In the fourth period TP4A, the seventh transistor T7 and the eighth transistor T8 may be turned on in response to the bias gate signal GB. The seventh transistor T7 may be turned on, so that the light emitting element initialization voltage VAINT may be applied to the fifth node N5. The eighth transistor T8 may be turned on, so that the bias voltage VB may be applied to the second node N2.

In the first to fourth periods TP1A, TP2A, TP3A and TP4A, the emission signal EM may have an inactivation level. In the first to fourth periods TP1A, TP2A, TP3A and TP4A, the fifth transistor T5 and the sixth transistor T6 may be turned off in response to the emission signal EM. Accordingly, the pixel circuit PXA may not emit light.

In the fifth period TP5A, the fifth transistor T5 and the sixth transistor T6 may be turned on in response to the emission signal EM. Accordingly, the driving current generated based on a data voltage of a present frame may be applied to the light emitting element EE. The pixel circuit PXA may emit light based on a data voltage of a present frame. For example, the fifth period TP5A may be called as a "first emission period".

Figure 9:
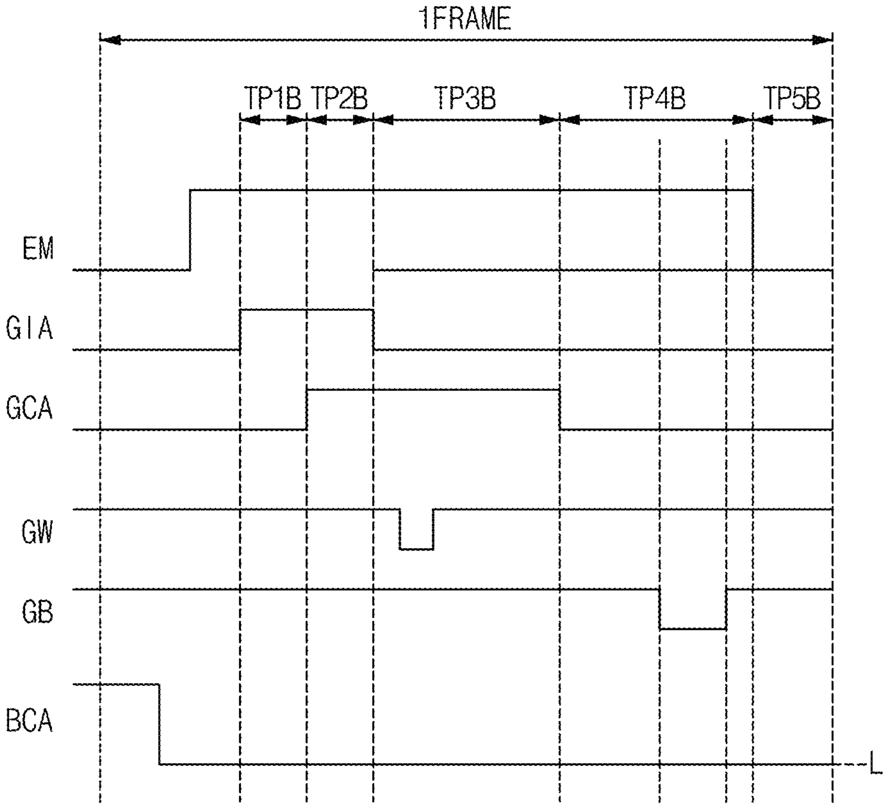
FIG. 9 is a timing diagram illustrating signals applied to a pixel circuit in a self-scan period of FIG. 5.
Figure 10:
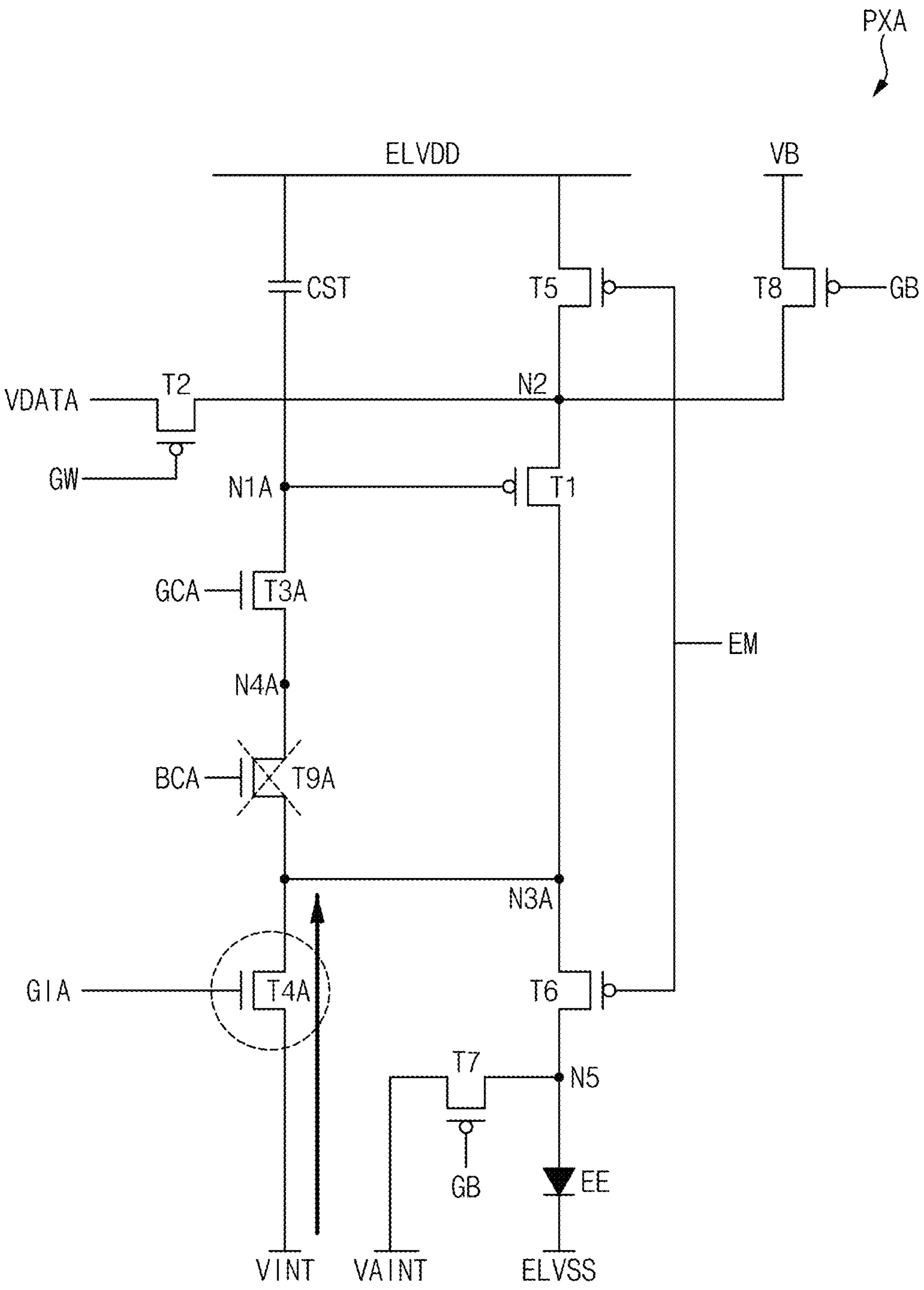
FIG. 10 is a circuit diagram illustrating an operation of a pixel circuit in a second initialization period.
Figure 11:
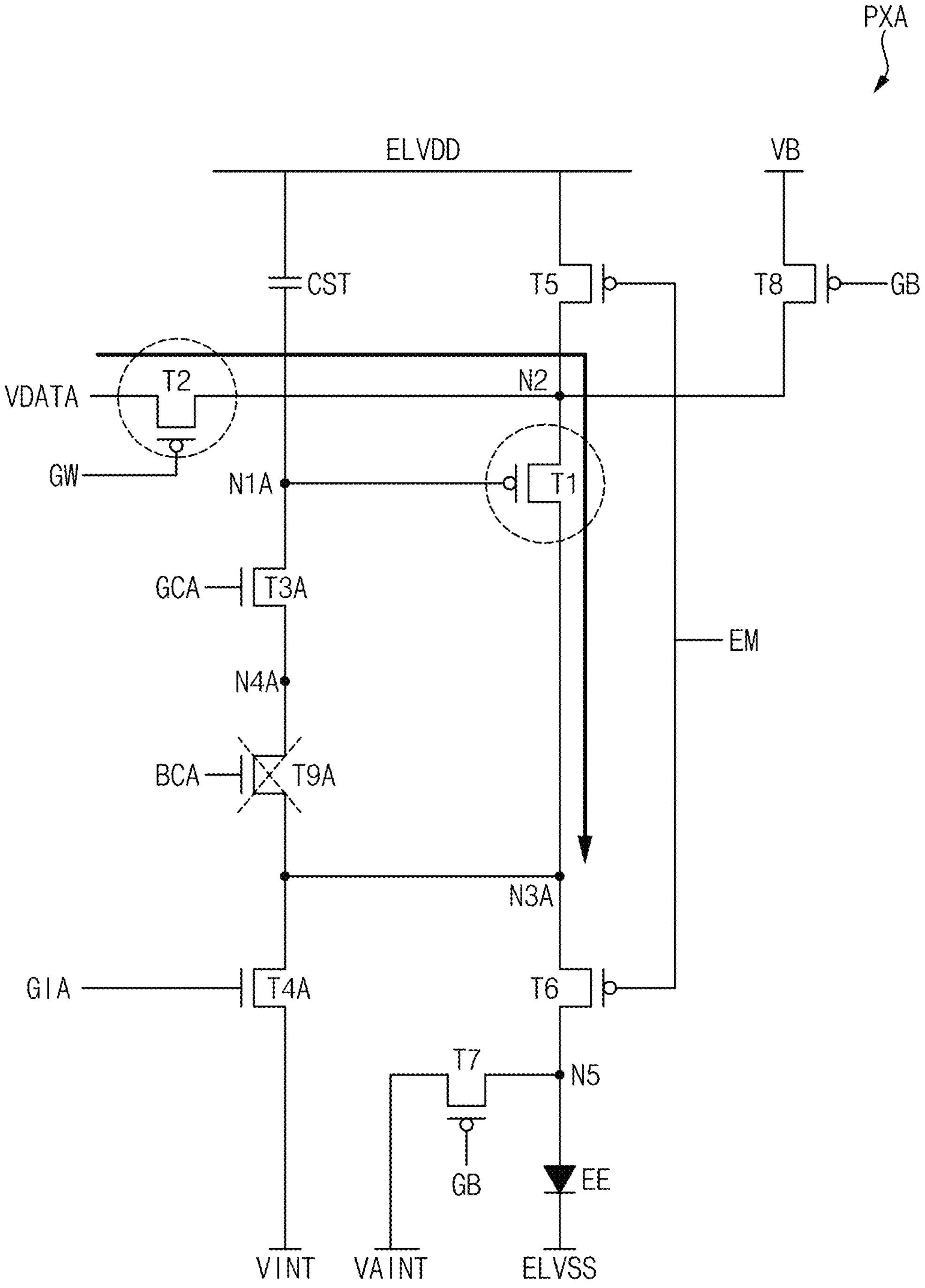
FIG. 11 is a circuit diagram illustrating an operation of a pixel circuit in a second writing period.

FIG. 9 is a timing diagram illustrating signals applied to a pixel circuit in a self-scan period of FIG. 5. FIG. 10 is a circuit diagram illustrating an operation of a pixel circuit PXA in a second initialization period. FIG. 11 is a circuit diagram illustrating an operation of a pixel circuit PXA in a second writing period.

Referring to FIG. 1 to FIG. 11, the self-scan period may include a first period TP1B, a second period TP2B, a third period TP3B, a fourth period TP4B and a fifth period TP5B.

In the first period TP1B, the initialization gate signal GIA may have an activation level, the compensation gate signal GCA may have an inactivation level, the write gate signal GW may have an inactivation level and the block control signal BCA may have an inactivation level. In the first period TP1B, the ninth transistor T9A may be turned off in response to the block control signal BCA. Accordingly, a voltage of the first node NIA may be maintained.

In the second period TP2B, as shown in FIG. 10, the initialization gate signal GIA may have an activation level, the compensation gate signal GCA may have an activation level, the write gate signal GW may have an activation level and the block control signal BCA may have an inactivation level. In the second period TP2B, the ninth transistor T9A may be turned off in response to the block control signal BCA. Accordingly, a voltage of the first node NIA may be maintained. For example, the second period TP2B may be called as a "second initialization period".

In the third period TP3B, as shown in FIG. 11, the initialization gate signal GIA may have an inactivation level, the compensation gate signal GCA may have an activation level, the write gate signal GW may have an activation level and the block control signal BCA may have an inactivation level. In the third period TP3B, the ninth transistor T9A may be turned off in response to the block control signal BCA. Accordingly, a voltage of the first node NIA may be maintained. For example, the third period TP3B may be called as s "second writing period".

In the fourth period TP4B, the initialization gate signal GIA may have an inactivation level, the compensation gate signal GCA may have an inactivation level, the write gate signal GW may have an inactivation level and the bias gate signal GB may have an activation level. In the fourth period TP4B, the seventh transistor T7 and the eighth transistor T8 may be turned on in response to the bias gate signal GB. The seventh transistor T7 may be turned on, so that the light emitting element initialization voltage VAINT may be applied to the fifth node N5. The eighth transistor T8 may be turned on, so that the bias voltage VB may be applied to the second node N2.

In the first to fourth periods TP1B, TP2B, TP3B and TP4B, the emission signal EM may have an inactivation level. In the first to fourth periods TP1B, TP2B, TP3B and TP4B, the fifth transistor T5 and the sixth transistor T6 may be turned off in response to the emission signal EM. Accordingly, the pixel circuit PXA may not emit light.

In the fifth period TP5B, the fifth transistor T5 and the sixth transistor T6 may be turned on in response to the emission signal EM. Accordingly, the driving current generated based on a data voltage of a previous frame may be applied to the light emitting element EE. The pixel circuit PXA may emit light based on a data voltage of a previous frame. For example, the fifth period TP5B may be called as s "second emission period".

In the self-scan period, the block control signal BCA may have an inactivation level. In the self-scan period, the ninth transistor T9A may be turned off in response to the block control signal BCA. In the self-scan period, the ninth transistor T9A may be turned off, so that the voltage of the first node NIA may be maintained. For example, the voltage of the first node N1A may be maintained as a data voltage of a previous frame in the self-scan period.

Figure 12:
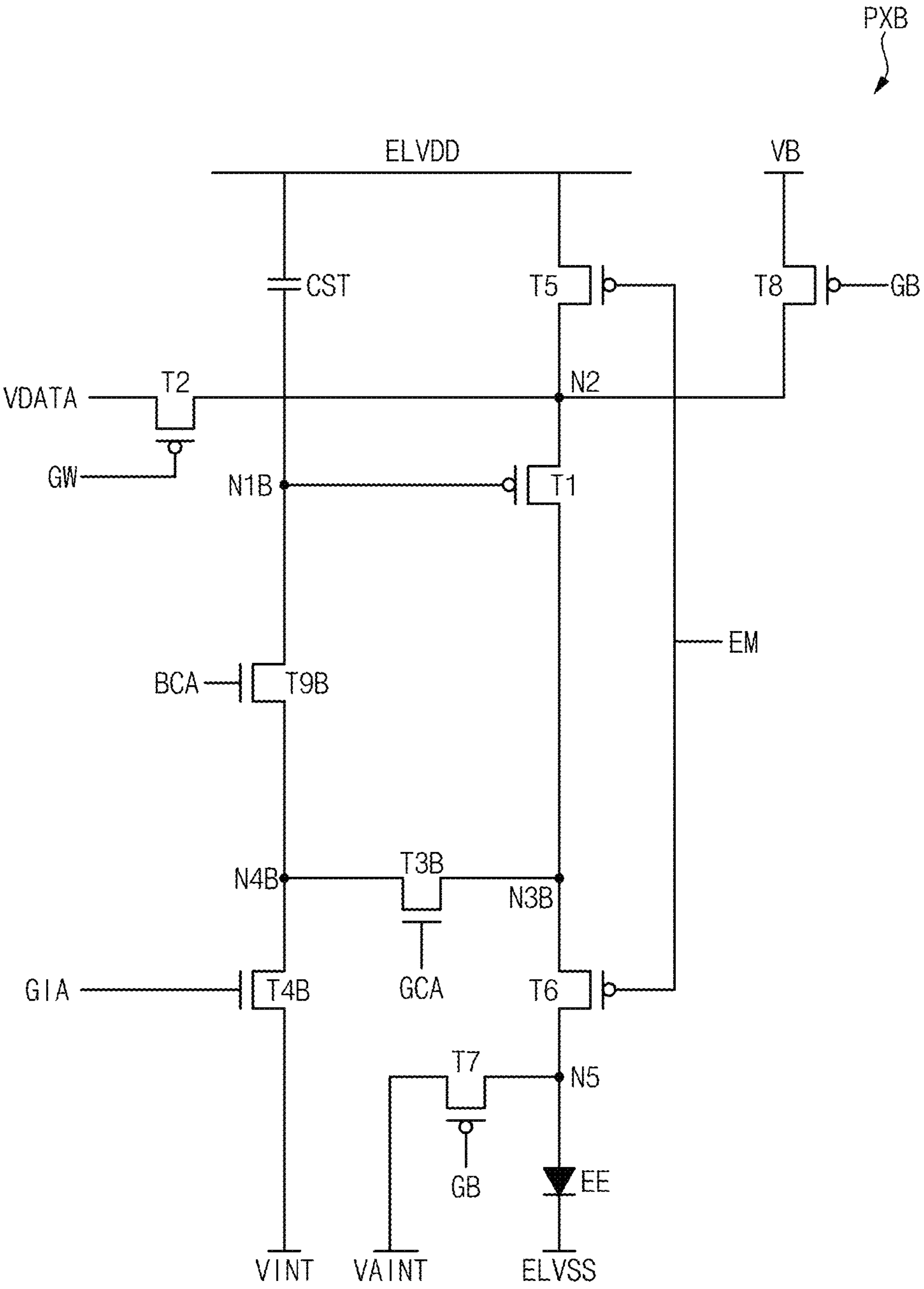
FIG. 12 is a circuit diagram illustrating another example of a pixel circuit of FIG. 1.

FIG. 12 is a circuit diagram illustrating another example of a pixel circuit PX of FIG. 1.

Referring to FIG. 1 to FIG. 3, FIG. 5 and FIG. 12, a pixel circuit PXB may include a first transistor T1, a second transistor T2, a third transistor T3B, a fourth transistor T4B, a fifth transistor T5, a sixth transistor T6, a seventh transistor T7, an eighth transistor T8, a ninth transistor T9B, a storage capacitor CST and a light emitting element EE.

The pixel circuit PXB according to the present embodiment is substantially the same as the pixel circuit PXA of FIG. 4, except that a connection of the first transistor T1, a connection of the fourth transistor T4B and a connection of the ninth transistor T9B. Accordingly, the same reference numerals will be used to refer to the same and any repetitive explanation concerning the above elements will be omitted.

The first transistor T1 may include a control electrode connected to a first node NIB, a first electrode connected to a second node N2 and a second electrode connected to a third node N3B. The first transistor T1 may generate a driving current based on a voltage of the first node NIB. For example, the first transistor T1 may be called as a driving transistor.

The third transistor T3B may include a control electrode for receiving the compensation gate signal GCA, a first electrode connected a third node N4B and a second electrode connected to the fourth node N4B. The third transistor T3B may connect the third node N3B and the fourth node N4B in response to the compensation gate signal GCA. For example, the third transistor T3B may be called as a compensation transistor.

The fourth transistor T4B may include a control electrode for receiving the initialization gate signal GIA, a first electrode for receiving the initialization voltage VINT and a second electrode connected to the fourth node N4B. The fourth transistor T4B may apply the initialization voltage VINT to the fourth node N4B in response to the initialization gate signal GIA. For example, the fourth transistor T4B may be called as an initialization transistor.

The ninth transistor T9B may include a control electrode for receiving the block control signal BCA, a first electrode connected to the fourth node N4B and a second electrode connected to the first node NIB. The ninth transistor T9A may connect the fourth node N4B and the first node NIB in response to the block control signal BCA. For example, the ninth transistor T9B may be called as a block control transistor.

Figure 13:
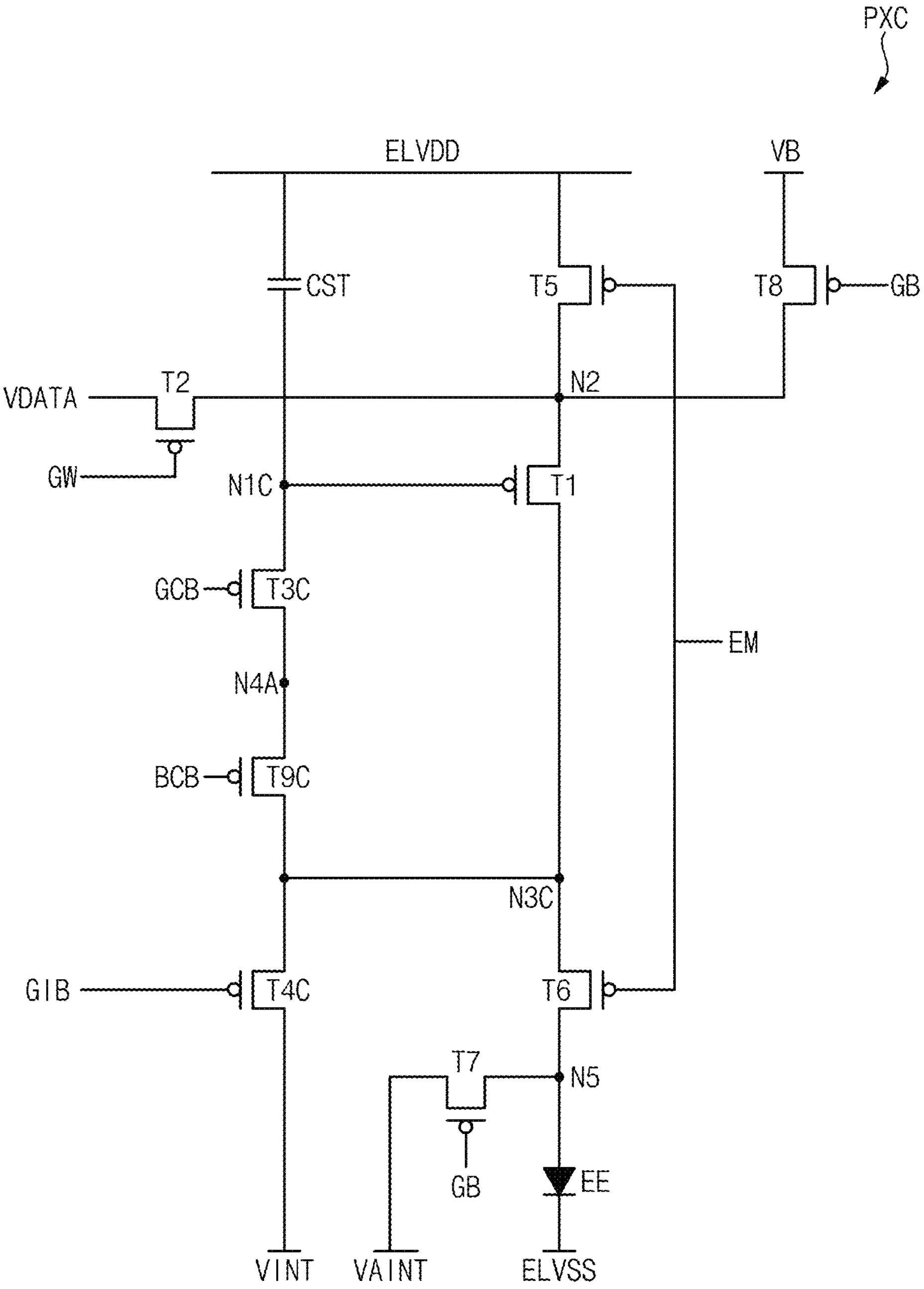
FIG. 13 is a circuit diagram illustrating still another example of a pixel circuit of FIG. 1.

FIG. 13 is a circuit diagram illustrating still another example of a pixel circuit PX of FIG. 1.

Referring to FIG. 1 to FIG. 3, FIG. 5 and FIG. 13, a pixel circuit PXC may include a first transistor T1, a second transistor T2, a third transistor T3C, a fourth transistor T4C, a fifth transistor T5, a sixth transistor T6, a seventh transistor T7, an eighth transistor T8, a ninth transistor T9C, a storage capacitor CST and a light emitting element EE.

The pixel circuit PXC according to the present embodiment is substantially the same as the pixel circuit PXA of FIG. 4, except that the first to ninth transistors T1, T2, T3C, T4C, T5, T6, T7, T8 and T9C are P-type transistors. Accordingly, the same reference numerals will be used to refer to the same and any repetitive explanation concerning the above elements will be omitted.

Figure 14:
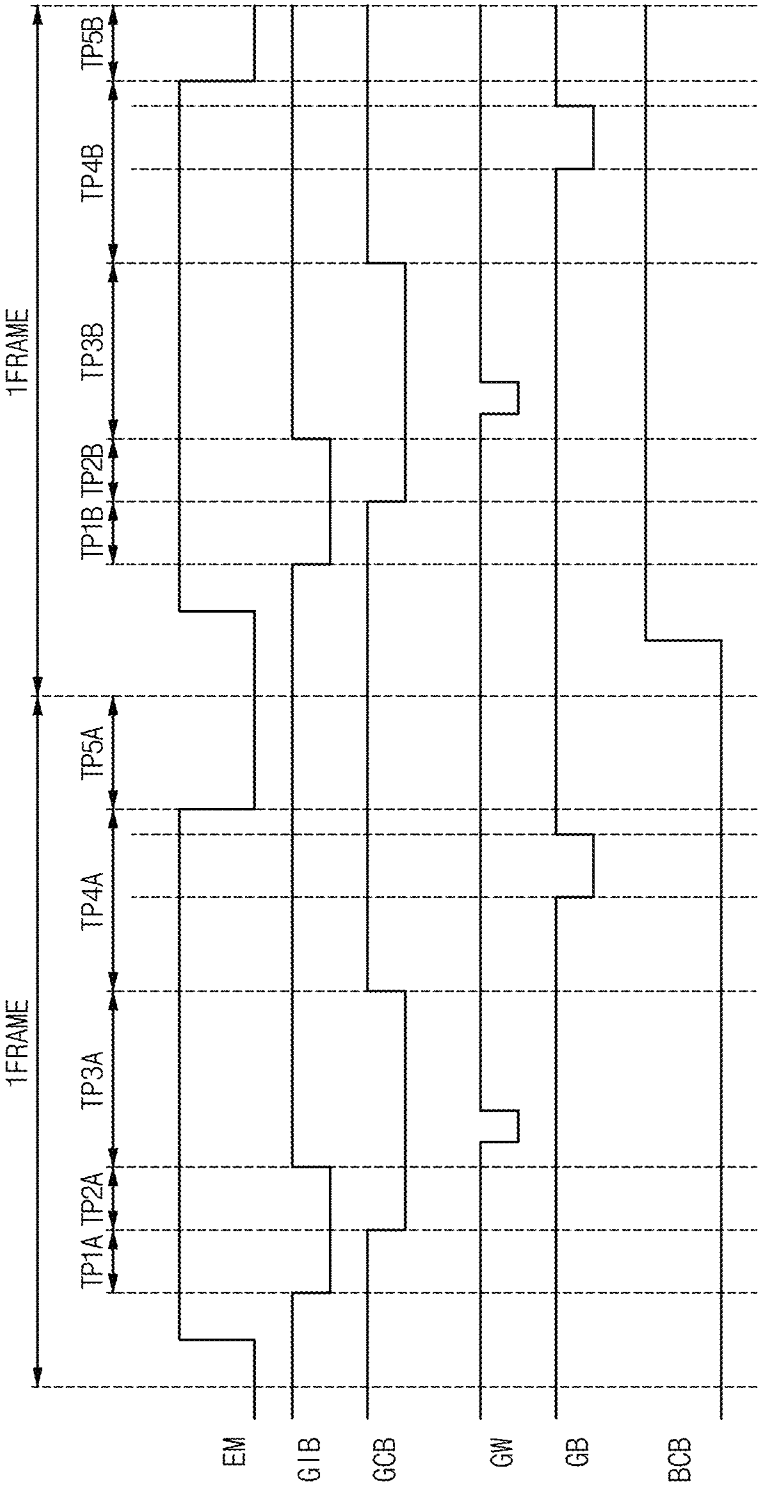
FIG. 14 is a timing diagram illustrating signals applied to a pixel circuit of FIG. 13.

FIG. 14 is a timing diagram illustrating signals applied to a pixel circuit PXC of FIG. 13.

Referring to FIG. 14, a period in which the pixel circuit PXC is driven may include an address period and a self-scan period.

Input signals according to the present embodiment is substantially the same as the timing diagram of FIG. 5, except that an activation level of the block control signal BCB is a low level, an inactivation level of the block control signal BCB is a high level, an activation level of an initialization gate signal GIB is a low level, an inactivation level of the initialization gate signal GIB is a high level, an activation level of an compensation gate signal GCB is a low level and an inactivation level of the compensation gate signal GCB is a high level. Accordingly, the same reference numerals will be used to refer to the same and any repetitive explanation concerning the above elements will be omitted.

Figure 15:
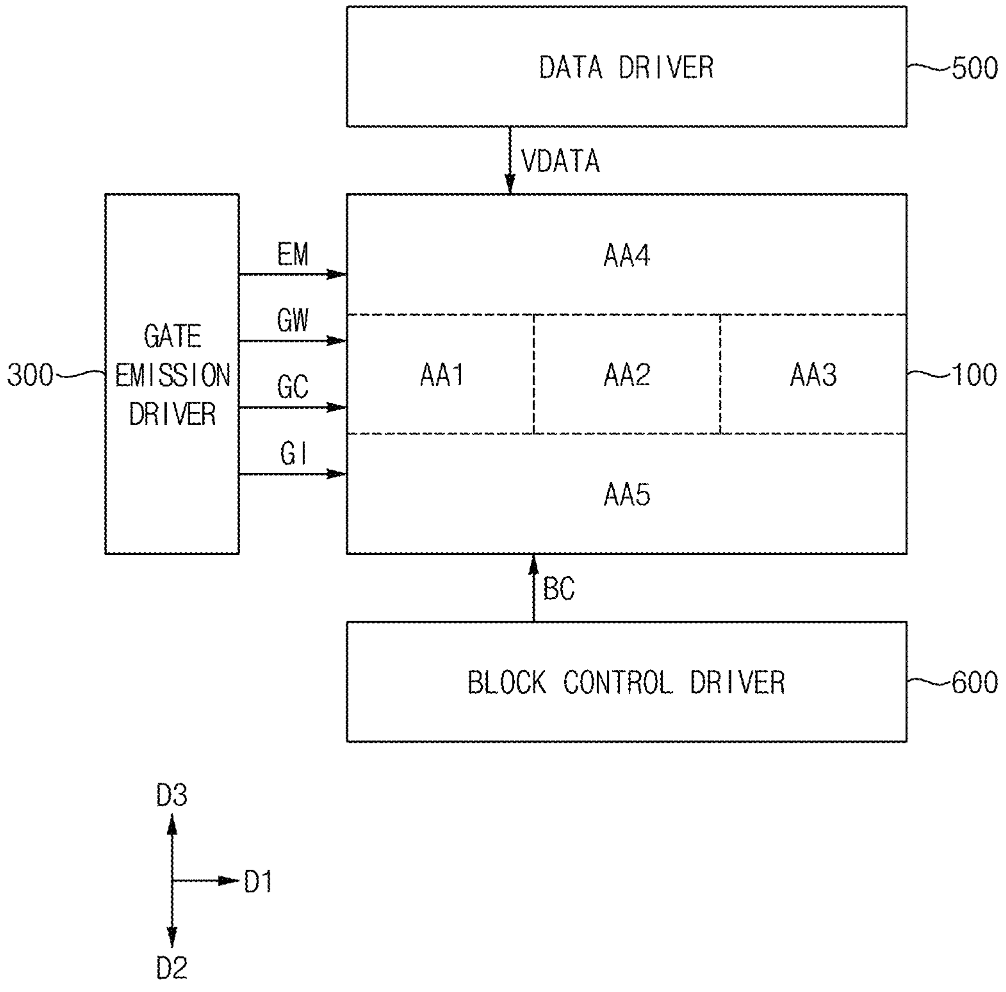
FIG. 15 is a block diagram illustrating a display panel, a gate emission driver, a data driver and a block control driver of FIG. 1.

FIG. 15 is a block diagram illustrating a display panel 100, a gate emission driver 300, a data driver 500 and a block control driver 600 of FIG. 1.

Referring to FIG. 1 and FIG. 15, the display panel 100 may include the first display region AA1, the second display region AA2, the third display region AA3, a fourth display region AA4 and a fifth display region AA5. For example, the display region may include the first display region AA1, the second display region AA2, the third display region AA3, the fourth display region AA4 and the fifth display region AA5.

The first display region AA1 may be located spaced apart from the gate emission driver 300 in the first direction D1. The second display region AA2 may be located adjacent to the first display region AA1 in the first direction D1. The third display region AA3 may be located adjacent to the second display region AA2 in the first direction D1. The fourth display region AA4 may be located adjacent to the second display region AA2 in the third direction D3. The fifth display region AA5 may be located adjacent to the second display region AA2 in a second direction D2. A driving frequency of the first display region AA1 may be different from a driving frequency of the second display region AA2. A driving frequency of the second display region AA2 may be different from a driving frequency of the third display region AA3. For example, the first display region AA1 may emit as a first driving frequency. For example, the second display region AA2 may emit as the first driving frequency. For another example, the second display region AA2 may emit as a second driving frequency different from the first driving frequency. For example, the third display region AA3 may emit as the first driving frequency. For another example, the third display region AA3 may emit as a second driving frequency different from the first driving frequency. For example, the fourth display region AA4 may emit as the first driving frequency. For another example, the fourth display region AA4 may emit as a second driving frequency different from the first driving frequency. For example, the fifth display region AA5 may emit as the first driving frequency. For another example, the fifth display region AA5 may emit as a second driving frequency different from the first driving frequency. For example, the first driving frequency may be about 1 Hz. For example, the second driving frequency may be about 120 Hz. However, the present invention is not limited to a value of the driving frequency.

The driving frequency of the first display region AA1 may be different from the driving frequency of the second display region AA2, so that the display panel 100 may support the multiple division of the driving frequency. The display panel 100 may support the multiple division of the driving frequency, so that a power consumption of the display apparatus 1 may be effectively reduced. For example, display panel 100 may support the horizontal multiple division of the driving frequency.

The driving frequency of the second display region AA2 may be different from the driving frequency of the fourth display region AA4, so that the display panel 100 may support the multiple division of the driving frequency. The display panel 100 may support the multiple division of the driving frequency, so that a power consumption of the display apparatus 1 may be effectively reduced. For example, display panel 100 may support the vertical multiple division of the driving frequency.

In the present embodiment, the display panel 100 may support the multiple division of the driving frequency according to display regions.

Figure 16:
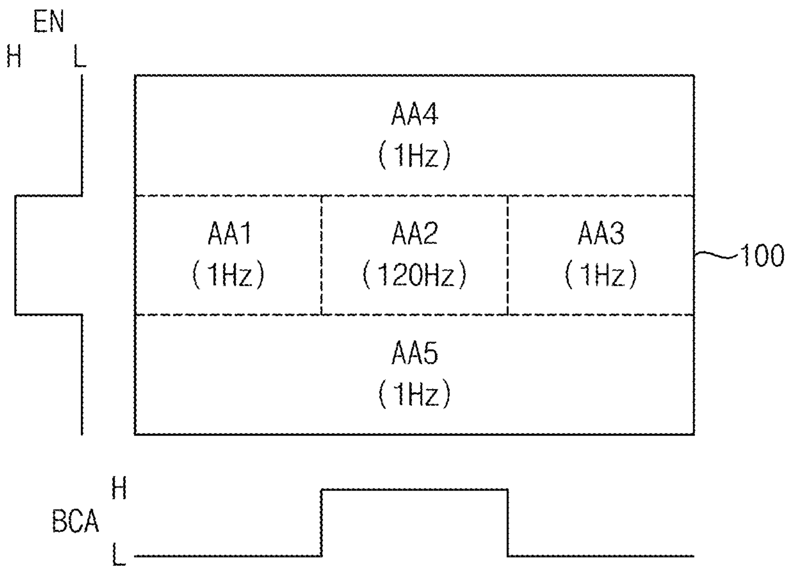
FIG. 16 is a conceptual diagram illustrating an enable signal applied to a gate emission driver of FIG. 1 according to driving frequencies of portions of a display panel of FIG. 1.
Figure 17:
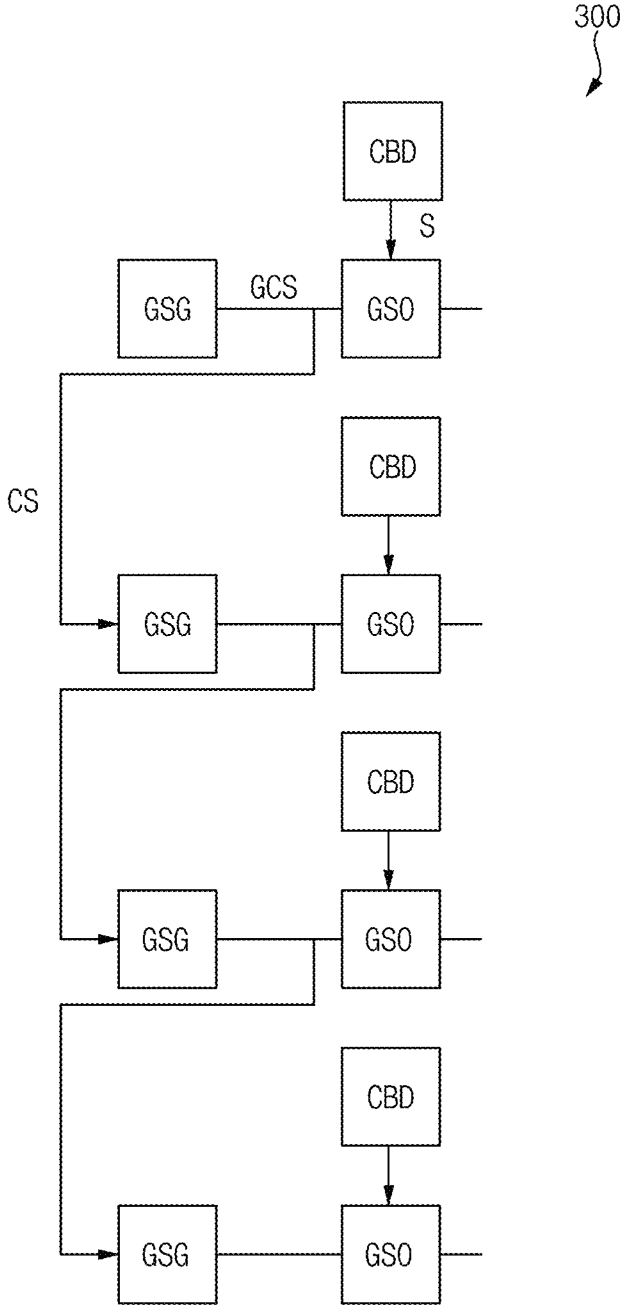
FIG. 17 is a conceptual diagram illustrating a gate emission driver of FIG. 1.

FIG. 16 is a conceptual diagram illustrating an enable signal EN applied to a gate emission driver 300 of FIG. 1 according to driving frequencies of portions of a display panel 100 of FIG. 1. FIG. 17 is a conceptual diagram illustrating a gate emission driver 300 of FIG. 1.

Referring to FIG. 1, FIG. 4 and FIG. 15 to FIG. 17, the gate emission driver 300 may include a gate signal block and an output control signal block CBD. The gate signal block may include a gate signal generator GSG, and a gate signal outputter GSO. The gate signal generator GSG may generate a carry signal CS and a gate control signal GCS based on a previous carry signal. The gate signal outputter GSO may output the gate signal based on the previous carry signal. In an embodiment, the gate signal outputter GSO may output the gate signal based on the gate control signal GCS. In the present embodiment, the gate signal outputter GSO may output the gate signal in response to an output control signal S. The output control signal block CBD may generate the output control signal S based on the emission signal EM[n] and the enable signal EN. The output control signal block CBD may output the output control signal S to the gate signal outputter GSO. For example, the gate signal generator GSG may be called as a first driver. For example, the gate signal outputter GSO may be called as a second driver.

The gate signal outputter GSO may output or not output a gate pulse based on the enable signal EN.

For example, when the enable signal EN has a high level H, the gate signal outputter may output the gate pulse. For example, when the enable signal EN has the high level H, the gate signal may have an activation level.

For example, when the enable signal EN has a low level L, the gate signal outputter may not output the gate pulse. For example, when the enable signal EN has the low level L, the gate signal may have an inactivation level.

The gate emission driver 300 may output the gate pulse at a high frequency (e.g., 120 Hz) for a portion of the display panel 100 where a high frequency driving is necessary, and may output a gate pulse at a low frequency (e.g., 1 Hz) for a portion of the display panel 100 where a low frequency driving is necessary according to the enable signal EN.

The output control signal block CBD may mask an output of the gate pulse to output the gate pulse in the low frequency (e.g., 1 Hz). For example, the output control signal block CBD may mask the output of the gate pulse by outputting the output control signal S to the gate signal outputter GSO.

In the present embodiment, the gate signal generator transfers the carry signal CS to a next stage regardless of the operation of the output control signal block CBD masking the output of the gate pulse, so that the gate emission driver 300 may support the multiple division of the driving frequency.

In an embodiment of FIG. 4, the pixel circuit PXA may emit light as a high frequency (e.g., 120 Hz) for a region within the display panel 100 that requires high-frequency driving, and may emit light as a low frequency (e.g., 1 Hz) for a region within the display panel 100 that requires low-frequency driving, based on a block control signal BCA.

For example, when the display panel 100 emits light as the high frequency, the block control signal BCA may have an activation level and the ninth transistor T9A may be turned on. The ninth transistor T9A may be turned on, so that a voltage of the first node NIA may be initialized and the writing operation may be performed.

For example, when the display panel 100 emits light as the low frequency, the block control signal BCA may have an inactivation level and the ninth transistor T9A may be turned off. The ninth transistor T9A may be turned off, so that a voltage of the first node NIA may be maintained. Accordingly, the pixel circuit PXA emit light based on a data voltage of a previous frame.

Accordingly, the display panel 100 may support the multiple division of the driving frequency, so that a power consumption of the display apparatus 1 may be further reduced.

Figure 18:
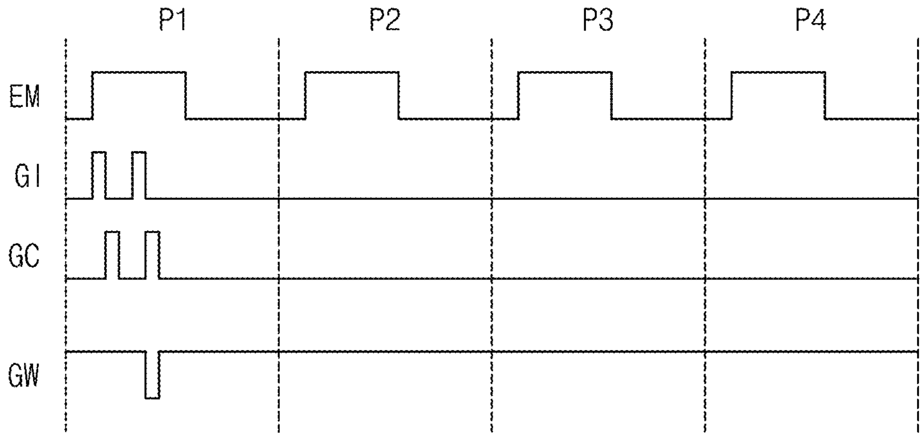
FIG. 18 is a timing diagram illustrating input signals applied to the pixel circuit of FIG. 4 in an address period.
Figure 19:
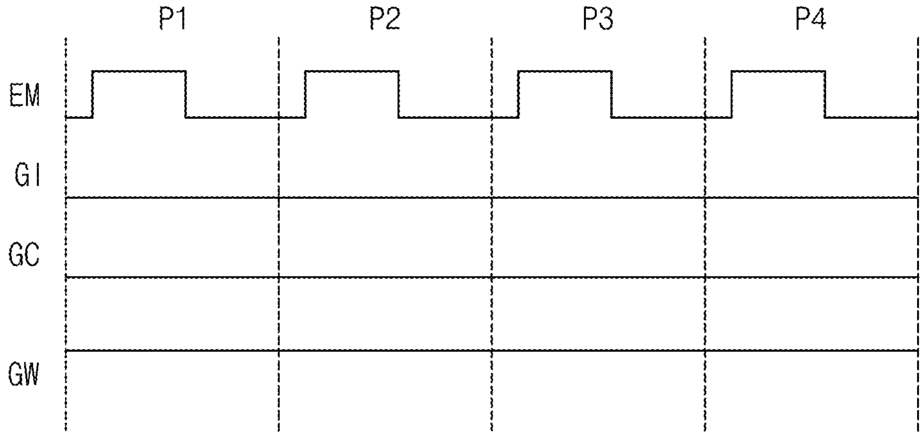
FIG. 19 is a timing diagram illustrating input signals applied to the pixel circuit of FIG. 4 in a self-scan period.

FIG. 18 is a timing diagram illustrating input signals applied to the pixel circuit PXA of FIG. 4 in an address period. FIG. 19 is a timing diagram illustrating input signals applied to the pixel circuit PXA of FIG. 4 in a self-scan period.

Referring to FIG. 1, FIG. 4 and FIG. 15 to FIG. 19, in a first frame P1 of FIG. 18 which is the address period, the initialization gate signal GI, the compensation gate signal GC and the write gate signal GW may have active pulses. Second to fourth frames P2 to P4 of FIG. 18 may be the self-scan periods.

For example, in the first frame P1, the initialization gate signal GI may output two pulses in the frame. The compensation gate signal GC may output two pulses in the frame. However, the present invention is not limited to the number of pulse of the initialization gate signal GI and the compensation GC.

In a first frame P1 of FIG. 19 which is the self-scan period, the initialization gate signal GI, the compensation gate signal GC and the write gate signal GW may not have any active pulses. Second to fourth frames P2 to P4 of FIG. 19 may be the self-scan periods.

Figure 20:
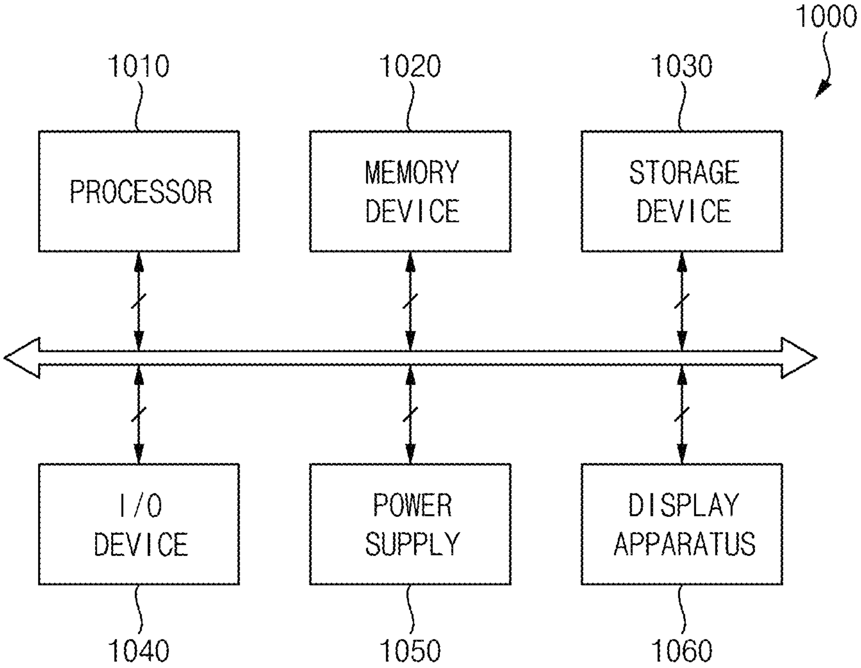
FIG. 20 is a block diagram illustrating an electronic apparatus according to an embodiment of the present invention.
Figure 21:
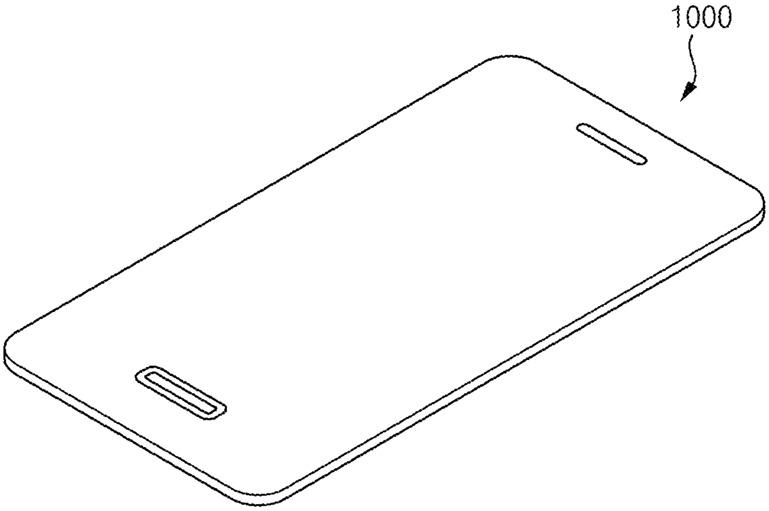
FIG. 21 is a diagram illustrating an example in which the electronic apparatus of FIG. 20 is implemented as a smart phone.

FIG. 20 is a block diagram illustrating an electronic apparatus 1000 according to an embodiment of the present invention. FIG. 21 is a diagram illustrating an example in which the electronic apparatus of FIG. 20 is implemented as a smart phone.

Referring to FIG. 20, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. Additionally, the electronic apparatus 1000 may further include a plurality of ports for communicating with a video card, a sound card, a memory card, a universal serial bus (USB) device, other electronic apparatus, etc.

In an embodiment, as illustrated in FIG. 21, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG, the app-on signal APPON and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Referring to FIG. 21, the electronic apparatus of the present invention is shown implemented as a smartphone, but the present invention is not limited thereto. The electronic apparatus may be a television, a monitor, a laptop computer, or a tablet. Additionally, the electronic apparatus may be a car.

The display apparatus according to the embodiments may be applied to a display apparatus included in a computer, a notebook, a mobile phone, a smart phone, a smart pad, a PMP, a PDA, an MP3 player, or the like.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A display apparatus comprising:

a display panel including a pixel circuit;

a gate emission driver configured to output gate signals to the display panel;

a data driver configured to apply a data voltage to the display panel; and a block control driver configured to output a block control signal to the display panel, wherein the pixel circuit includes:

a driving transistor including a control electrode connected to a first node, a first electrode connected to a second node, and a second electrode connected to a third node and configured to generate a driving current based on a voltage of the first node;

a writing transistor configured to apply the data voltage to the second node in response to a write gate signal;

a block control transistor configured to connect the third node and a fourth node in response to the block control signal;

an initialization transistor configured to apply an initialization voltage to the third node in response to an initialization gate signal;

a compensation transistor configured to connect the fourth node and the first node in response to a compensation gate signal; and a light emitting element configured to emit light based on the driving current.

2. The display apparatus of claim 1, wherein a period in which the pixel circuit is driven includes:

an address period in which the light emitting element emits light based on a data voltage of a present frame; and a self-scan period following the address period, in which the light emitting element emits light based on a data voltage of a previous frame, and wherein in the address period, the block control signal has an activation level and the block control transistor is turned on.

3. The display apparatus of claim 2, wherein the address period includes a first initialization period, a first writing period and a first emission period, wherein in the first initialization period, the initialization gate signal, the compensation gate signal and the block control signal have the activation level, wherein in the first writing period, the write gate signal, the compensation gate signal and the block control signal have the activation level, and wherein in the first initialization period and the first writing period, the block control transistor is turned on.

4. The display apparatus of claim 2, wherein in the self-scan period, the block control signal has an inactivation level and the block control transistor is turned off.

5. The display apparatus of claim 4, wherein the self-scan period includes a second initialization period, a second writing period and a second emission period, and wherein in the second initialization period and the second writing period, the block control signal has an inactivation level.

6. The display apparatus of claim 1, wherein the gate emission driver further outputs an emission signal, wherein the pixel circuit further includes:

a first emission transistor configured to apply a first power voltage to the second node in response to the emission signal; and a second emission transistor configured to apply the driving current to a fifth node in response to the emission signal.

7. The display apparatus of claim 6, wherein the pixel circuit further includes:

a light emitting element initialization transistor configured to apply a light emitting element initialization voltage to the fifth node in response to a bias gate signal; and a bias transistor configured to apply a bias voltage to the second node in response to the bias gate signal.

8. The display apparatus of claim 1, wherein the writing transistor includes a control electrode for receiving the write gate signal, a first electrode for receiving the data voltage and a second electrode connected to the second node, wherein the compensation transistor includes a control electrode for receiving the compensation gate signal, a first electrode connected to the fourth node and a second electrode connected to the first node, wherein the initialization transistor includes a control electrode for receiving the initialization gate signal, a first electrode for receiving the initialization voltage and a second electrode connected to the third node, and wherein the block control transistor includes a control electrode for receiving the block control signal, a first electrode connected to the third node and a second electrode connected to the fourth node.

9. The display apparatus of claim 8, wherein the gate emission driver further outputs an emission signal, wherein the pixel circuit further includes:

a first emission transistor including a control electrode for receiving the emission signal, a first electrode for receiving a first power voltage and a second electrode connected to the second node; and a second emission transistor including a control electrode for receiving the emission signal, a first electrode connected to the third node and a second electrode connected to a fifth node, and wherein the light emitting element includes a first electrode connected to the fifth node and a second electrode for receiving a second power voltage.

10. The display apparatus of claim 9, wherein the pixel circuit further includes:

a light emitting element initialization transistor including a control electrode for receiving a bias gate signal, a first electrode for receiving a light emitting element initialization voltage and a second electrode connected to the fifth node; and a bias transistor including a control electrode for receiving the bias gate signal, a first electrode for receiving a bias voltage and a second electrode connected to the second node.

11. The display apparatus of claim 1, wherein the driving transistor and the writing transistor are P-type transistors, and wherein the compensation transistor, the initialization transistor and the block control transistor are N-type transistors.

12. The display apparatus of claim 1, wherein the gate signals are outputted to the pixel circuit through gate lines extend in a first direction, wherein the data signal is outputted to the pixel circuit through a data line extend in a second direction different from the first direction, and wherein the block control signal is outputted to the pixel circuit through a block control line extend in the second direction.

13. The display apparatus of claim 1, wherein the display panel includes:

a first display region located spaced apart from the gate emission driver in a first direction; and a second display region located adjacent to the first display region in the first direction, and wherein a driving frequency of the first display region is different from a driving frequency of the second display region.

14. The display apparatus of claim 13, wherein the gate emission driver includes a gate signal block and an output control signal block configured to control an output of the gate signal block, wherein the gate signal block generates a carry signal and the gate signals based on a previous carry signal and outputs the gate signals in response to an output control signal, wherein the display panel further includes a third display region located adjacent to the first display region in a second direction different from the first direction, and wherein the driving frequency of the second display region is different from a driving frequency of the third display region.

15. A display apparatus comprising:

a display panel including a pixel circuit;

a gate emission driver configured to output gate signals to the display panel;

a data driver configured to apply a data voltage to the display panel; and a block control driver configured to output a block control signal to the display panel, wherein the pixel circuit includes:

a driving transistor including a control electrode connected to a first node, a first electrode connected to a second node, and a second electrode connected to a third node and configured to generate a driving current based on a voltage of the first node;

a writing transistor configured to apply the data voltage to the second node in response to a write gate signal;

a compensation transistor configured to connect the third node and a fourth node in response to a compensation gate signal;

a block control transistor configured to connect the fourth node and the first node in response to the block control signal;

an initialization transistor configured to apply an initialization voltage to the fourth node in response to an initialization gate signal; and a light emitting element configured to emit light based on the driving current.

16. The display apparatus of claim 15, wherein a period in which the pixel circuit is driven includes:

an address period in which the light emitting element emits light based on a data voltage of a present frame; and a self-scan period following the address period, in which the light emitting element emits light based on a data voltage of a previous frame, and wherein in the address period, the block control signal has an activation level and the block control transistor is turned on.

17. The display apparatus of claim 16, wherein in the self-scan period, the block control signal has an inactivation level and the block control transistor is turned off.

18. A pixel circuit comprising:

a driving transistor including a control electrode connected to a first node, a first electrode connected to a second node, and a second electrode connected to a third node and configured to generate a driving current based on a voltage of the first node;

a writing transistor configured to apply a data voltage to the second node in response to a write gate signal;

a block control transistor configured to connect the third node and a fourth node in response to a block control signal;

an initialization transistor configured to apply an initialization voltage to the third node in response to an initialization gate signal;

a compensation transistor configured to connect the fourth node and the first node in response to a compensation gate signal; and a light emitting element configured to emit light based on the driving current.

19. The pixel circuit of claim 18, wherein a period in which the pixel circuit is driven includes:

an address period in which the light emitting element emits light based on a data voltage of a present frame; and a self-scan period following the address period, in which the light emitting element emits light based on a data voltage of a previous frame, and wherein in the address period, the block control signal has an activation level and the block control transistor is turned on.

20. An electronic apparatus comprising:

a display panel including a pixel circuit;

a gate emission driver configured to output gate signals to the display panel;

a data driver configured to apply a data voltage to the display panel;

a block control driver configured to output a block control signal to the display panel;

a driving controller configured to control the gate emission driver, the data driver and the block control driver based on an input control signal; and a processor configured to output the input control signal, wherein the pixel circuit includes:

a driving transistor including a control electrode connected to a first node, a first electrode connected to a second node, and a second electrode connected to a third node and configured to generate a driving current based on a voltage of the first node;

a writing transistor configured to apply the data voltage to the second node in response to a write gate signal;

a block control transistor configured to connect the third node and a fourth node in response to the block control signal;

an initialization transistor configured to apply an initialization voltage to the third node in response to an initialization gate signal;

a compensation transistor configured to connect the fourth node and the first node in response to a compensation gate signal; and a light emitting element configured to emit light based on the driving current.

* * * * *